United States Patent
Wang et al.

(10) Patent No.: US 11,375,120 B2
(45) Date of Patent: Jun. 28, 2022

(54) METHOD AND DEVICE FOR ASSISTING CAPTURING OF AN IMAGE

(71) Applicant: Huawei Technologies Co., Ltd., Shenzhen (CN)

(72) Inventors: Shuang Wang, Dongguan (CN); Dongmin Hu, Shenzhen (CN); Dahe Kou, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/253,552

(22) PCT Filed: Apr. 22, 2020

(86) PCT No.: PCT/CN2020/086011
§ 371 (c)(1),
(2) Date: Dec. 17, 2020

(87) PCT Pub. No.: WO2020/259038
PCT Pub. Date: Dec. 30, 2020

(65) Prior Publication Data
US 2021/0168300 A1    Jun. 3, 2021

(30) Foreign Application Priority Data
Jun. 24, 2019   (CN) .......................... 201910551129.4

(51) Int. Cl.
*H04N 5/225*   (2006.01)
*H04N 5/232*   (2006.01)
(Continued)

(52) U.S. Cl.
CPC ... *H04N 5/232935* (2018.08); *G06F 3/04847* (2013.01); *G06F 3/04883* (2013.01);
(Continued)

(58) Field of Classification Search
CPC ....... H04N 5/232935; H04N 5/232941; H04N 5/23216; H04N 5/23296; G06F 3/04847; G06F 3/04883
(Continued)

(56) References Cited

U.S. PATENT DOCUMENTS 6,977,676 B1 * 12/2005 Sato .................... H04N 5/23206
348/211.11
2002/0152557 A1 * 10/2002 Elberbaum ............ H04N 7/181
8/405

(Continued)

FOREIGN PATENT DOCUMENTS

| CN | 101064773 A | 10/2007 |
| CN | 104052923 A | 9/2014 |

(Continued)

*Primary Examiner* — Usman A Khan
(74) *Attorney, Agent, or Firm* — Leydig, Voit & Mayer, Ltd.

(57) ABSTRACT

A method is disclosed for capturing an image using an electronic device having a camera. The method comprises starting the camera in response to a first user input, displaying a first preview interface including a first preview image captured by a default lens of the camera, displaying a second preview interface in response to a second user input for increasing a zooming ratio in the first preview frame and when the zooming ratio in the first preview interface is greater than or equal to a threshold value, the second preview interface including a first frame and a second frame, and adjusting a zoom ratio of the second preview image in the second frame in response to a third user input for changing the zoom ratio.

17 Claims, 31 Drawing Sheets

(51) Int. Cl.
*G06F 3/04847* (2022.01)
*G06F 3/04883* (2022.01)

(52) U.S. Cl.
CPC ..... *H04N 5/23216* (2013.01); *H04N 5/23296* (2013.01); *H04N 5/232941* (2018.08)

(58) Field of Classification Search
USPC .................................................. 348/207.99
See application file for complete search history.

(56) References Cited

U.S. PATENT DOCUMENTS

| | | | |
|---|---|---|---|
| 2005/0100087 A1* | 5/2005 | Hasegawa | H04N 7/181 375/240.01 |
| 2007/0200933 A1 | 8/2007 | Watanabe et al. | |
| 2009/0244323 A1* | 10/2009 | Carter | H04N 5/23218 348/231.99 |
| 2010/0141803 A1* | 6/2010 | Jung | H04N 5/262 348/240.3 |
| 2012/0300051 A1 | 11/2012 | Daigo et al. | |
| 2014/0063313 A1* | 3/2014 | Choi | G06F 3/0488 348/333.02 |
| 2016/0316147 A1* | 10/2016 | Bernstein | H04N 5/232939 |
| 2018/0069983 A1* | 3/2018 | Cho | G06T 3/4007 |

FOREIGN PATENT DOCUMENTS

| | | |
|---|---|---|
| CN | 104994285 A | 10/2015 |
| CN | 105550631 A | 5/2016 |
| CN | 105991930 A | 10/2016 |
| CN | 106161941 A | 11/2016 |
| CN | 106454121 A | 2/2017 |
| CN | 106791378 A | 5/2017 |
| CN | 106909274 A | 6/2017 |
| CN | 107690649 A | 2/2018 |
| CN | 108028880 A | 5/2018 |
| CN | 108322670 A | 7/2018 |
| CN | 108353118 A | 7/2018 |
| CN | 108391058 A | 8/2018 |
| CN | 108429881 A | 8/2018 |
| CN | 108781254 A | 11/2018 |
| CN | 109711290 A | 5/2019 |
| CN | 109889708 A | 6/2019 |
| CN | 110445978 A | 11/2019 |
| EP | 3286915 A1 | 2/2018 |
| EP | 3346694 A1 | 7/2018 |
| JP | 2000066087 A | 3/2000 |
| JP | 2012109733 A | 6/2012 |
| WO | 2016123893 A1 | 8/2016 |
| WO | 2017200049 A1 | 11/2017 |
| WO | 2018043884 A1 | 3/2018 |

* cited by examiner

METHOD AND DEVICE FOR ASSISTING CAPTURING OF AN IMAGE

CROSS-REFERENCE TO RELATED APPLICATIONS

This application is a national stage of International Application No. PCT/CN2020/086011, filed on Apr. 22, 2020, which claims priority to Chinese Patent Application No. 201910551129.4, filed on Jun. 24, 2019. Both of the aforementioned applications are hereby incorporated by reference in their entireties.

TECHNICAL FIELD

Embodiments of this application relate to the field of electronic technologies, and in particular, to a shooting method and a device.

BACKGROUND

With the development of electronic technologies, more camera lenses are integrated in an electronic device. The plurality of camera lenses may include camera lenses with a plurality of focal lengths, for example, may include a short-focus wide-angle camera lens, a middle-focus camera lens, and a long-focus camera lens. The camera lenses with different focal lengths may correspond to different framing ranges and different zoom ratios, thereby enriching shooting scenarios of the electronic device.

When a user changes a zoom ratio, a camera lens used for shooting by the electronic device may also be correspondingly changed. For example, when the electronic device switches to a large zoom ratio, the electronic device may switch from a wide-angle camera lens or a middle-focus camera lens to a long-focus camera lens, to display a preview picture of the long-focus camera lens and perform shooting by using the long-focus camera lens.

After the wide-angle camera lens or the middle-focus camera lens is switched to the long-focus camera lens, a framing range becomes smaller, and a to-be-shot target object easily goes out of the preview picture of the long-focus camera lens. In other words, the electronic device is prone to lose the to-be-shot target object. When the long-focus camera lens is used for preview, it is usually hard for the user to find the target object even after consuming a relatively long time.

SUMMARY

Embodiments of this application provide a shooting method and a device, to guide a user to move an electronic device based on a target object. In this way, the electronic device can quickly lock the target object by using a long-focus camera lens, thereby reducing a time for searching for the target object by the user and improving user experience.

To achieve the foregoing objective, the following technical solutions are used in the embodiments of this application.

According to an aspect, an embodiment of this application provides a shooting method. The shooting method includes: starting, by an electronic device, a camera; then, respectively collecting, by the electronic device, a first preview picture and a second preview picture by using a first camera lens and a second camera lens, where the second camera lens is a long-focus camera lens, and a framing range of the first camera lens is greater than a framing range of the second camera lens; displaying, by the electronic device, a first preview screen, where the first preview screen includes a first viewfinder frame, a second viewfinder frame, and a third viewfinder frame, the first viewfinder frame is used to display the first preview picture, a picture in the second viewfinder frame is a part of the first preview picture, content in the second viewfinder frame is a target object to be shot by the second camera lens, and the third viewfinder frame is used to display the second preview picture; and displaying, by the electronic device, first prompt information, where the first prompt information is used to guide a user to move the electronic device, so that the second camera lens can lock the target object after the electronic device is moved.

In this way, after the electronic device switches from the first camera lens such as a wide-angle camera lens or a middle-focus camera lens to a long-focus camera lens, namely, the second camera lens, the electronic device may use the prompt information to guide the user to move the electronic device. In this case, the long-focus camera lens can quickly lock the target object after the electronic device is moved. Further, the electronic device can take a picture of the target object by using the long-focus camera lens.

In a possible implementation, after the displaying, by the electronic device, a first preview screen, the method further includes: detecting, by the electronic device, a dragging operation performed on the second viewfinder frame by the user; and moving, by the electronic device, the second viewfinder frame on the first preview picture in response to the dragging operation, where the target object changes with a location of the second viewfinder frame.

In other words, the user may specify and change the target object by dragging the second viewfinder frame.

In another possible implementation, the method further includes: when the second viewfinder frame approaches the third viewfinder frame, moving, by the electronic device, the third viewfinder frame to keep away from the second viewfinder frame.

In this way, the second viewfinder frame and the third viewfinder frame do not overlap. Therefore, the user can intuitively and clearly see content in the two viewfinder frames.

In another possible implementation, the first prompt information is used to indicate a moving direction and a moving distance of the electronic device.

In other words, the electronic device may use the first prompt information to indicate the moving direction and a moving distance of the electronic device to the user.

In another possible implementation, the first prompt information is an arrow, a direction of the arrow is used to indicate a moving direction, and a length of the arrow is used to indicate a moving distance. After the electronic device is moved in the direction indicated by the arrow, the length of the arrow becomes shorter.

In other words, the arrow may be used as the first prompt information, and may dynamically indicate information such as whether the user moves the electronic device, a value of a moving distance, and whether a moving direction is correct.

In another possible implementation, the first prompt information may be further used to indicate a flipping direction and a flipping angle of the electronic device.

In this way, the first prompt information not only can indicate the moving direction and the moving amplitude of the electronic device to the user, but also can indicate the flipping direction and the flipping amplitude of the electronic device to the user.

In another possible implementation, a smaller size of the second viewfinder frame indicates a larger zoom ratio of the second preview picture in the third viewfinder frame, and a larger size of the second viewfinder frame indicates a smaller zoom ratio of the second preview picture in the third viewfinder frame. After the displaying, by the electronic device, a first preview screen, the method further includes: detecting, by the electronic device, an operation of adjusting a size of the second viewfinder frame by the user; adjusting, by the electronic device, the size of the second viewfinder frame; determining, by the electronic device, a zoom ratio based on the adjusted size of the second viewfinder frame; and displaying, by the electronic device, the second preview picture in the third viewfinder frame based on the zoom ratio.

In other words, the zoom ratio of the picture in the third viewfinder frame is negatively correlated with the size of the second viewfinder frame. The user may adjust the zoom ratio of the picture in the third viewfinder frame by adjusting the size of the second viewfinder frame.

In another possible implementation, after the displaying, by the electronic device, first prompt information, the method further includes: if the electronic device determines that the second camera lens locks the target object, displaying, by the electronic device, a second preview screen, where the second preview screen is used to display the second preview picture collected by the second camera lens.

In other words, when the electronic device displays the first preview screen, if the electronic device determines that the long-focus camera lens locks the target object, the electronic device may switch to a full-screen mode to preview the picture collected by the long-focus camera lens.

In another possible implementation, after the displaying, by the electronic device, a second preview screen, the method further includes: automatically taking, by the electronic device, a picture.

The electronic device switches to displaying the second preview screen only after determining that the long-focus camera lens locks the target object. Therefore, after switching to displaying the second preview screen, the electronic device can automatically take a picture, thereby reducing an operation of instructing shooting by the user.

In another possible implementation, the automatically taking, by the electronic device, a picture includes: if the electronic device determines that the second camera lens locks the target object, automatically taking, by the electronic device, a picture. The method further includes: if the electronic device determines that the second camera lens does not lock the target object, displaying, by the electronic device, the first prompt information.

In other words, after the electronic device switches to displaying the second preview screen, the electronic device determines whether the long-focus camera lens locks the target object. If the target object is locked, the electronic device automatically takes a picture; or if the target object is not locked, the electronic device continuously prompts the user to move the electronic device, so that the long-focus camera lens locks the target object again.

In another possible implementation, after the automatically taking, by the electronic device, a picture, the method further includes: if the electronic device determines that the second camera lens does not lock the target object, displaying, by the electronic device, the first prompt information; and taking, by the electronic device, a picture after detecting an operation of instructing shooting by the user.

In this solution, after the electronic device automatically takes a picture, the electronic device may further use the prompt information to instruct the user to move a mobile phone, so that the user can continue to manually take a picture.

In another possible implementation, after the displaying, by the electronic device, a second preview screen, the method further includes: taking, by the electronic device, a picture after detecting an operation of instructing shooting by the user.

In other words, after switching to displaying the second preview screen, the electronic device may take a picture after receiving an instruction of the user, instead of automatically taking a picture.

In another possible implementation, after the displaying, by the electronic device, a second preview screen, the method further includes: if the electronic device determines that the second camera lens does not lock the target object, displaying, by the electronic device, the first prompt information; and taking, by the electronic device, a picture after detecting an operation of instructing shooting by the user.

In other words, when the long-focus camera lens does not lock the target object, the electronic device may continuously use the prompt information to instruct the user to move the electronic device.

In another possible implementation, the method further includes: if the electronic device determines that the second camera lens locks the target object, stopping displaying, by the electronic device, the first prompt information.

In this way, after the long-focus camera lens locks the target object, the electronic device may stop prompting the user to move the electronic device.

In another possible implementation, if the electronic device determines that the second camera lens locks the target object, the electronic device displays second prompt information, where the second prompt information is used to indicate to the user that the second camera lens locks the target object.

In this way, after the long-focus camera lens locks the target object, the electronic device may use other prompt information to remind the user that the long-focus camera lens locks the target object and that shooting can be performed.

In another possible implementation, after the displaying, by the electronic device, first prompt information, the method further includes: when the second camera lens locks the target object, calculating, by the electronic device, a target motion posture corresponding to the electronic device. The displaying, by the electronic device, first prompt information includes: determining, by the electronic device, adjustment information based on a difference between a current motion posture and the target motion posture; and displaying, by the electronic device, the first prompt information based on the adjustment information. That the electronic device determines that the second camera lens locks the target object includes that, when the current motion posture matches the target motion posture, the electronic device determines that the second camera lens locks the target object.

In this solution, the electronic device may display the first prompt information based on the current motion posture and the target motion posture, and determine whether the long-focus camera lens locks the target object.

In another possible implementation, that the electronic device determines that the second camera lens locks the target object includes that, when a preview picture collected by the second camera lens matches the picture in the second viewfinder frame, the electronic device determines that the second camera lens locks the target object.

In this solution, based on whether the preview picture collected by the long-focus camera lens matches a picture of the target object, the electronic device may determine whether the long-focus camera lens locks the target object.

In another possible implementation, after the displaying, by the electronic device, a second preview screen, the method further includes: returning, by the electronic device, to display the first preview screen if detecting an operation of instructing returning by the user.

In another possible implementation, after the displaying, by the electronic device, a first preview screen, the method further includes: if the electronic device detects that the target object is in a moving state, moving, by the electronic device, the second viewfinder frame based on the moving state of the target object, so that the target object is in the second viewfinder frame.

In other words, the location of the second viewfinder frame may change with the movement of the target object, so that the second viewfinder frame can include the target object in real time.

Particularly, after the user specifies the target object, for example, the user drags the second viewfinder frame to specify the target object, the location of the second viewfinder frame may change with the movement of the target object.

In another possible implementation, if the electronic device detects that the target object is in the moving state, the method further includes: displaying, by the electronic device, a motion mark, where the motion mark is used to indicate a moving direction and a contour of the target object.

In this solution, when the target object is in the moving state, the electronic device may further display the motion mark, so that the user learns of information of the target object such as a moving direction and a contour size.

In another possible implementation, the displaying, by the electronic device, first prompt information includes: when the second camera lens locks the target object, calculating, in real time by the electronic device, a real-time target motion posture corresponding to the electronic device; determining, by the electronic device, adjustment information based on a difference between a current motion posture and the real-time target motion posture; and displaying, by the electronic device, the first prompt information based on the adjustment information. That the electronic device determines that the second camera lens locks the target object includes that, when the current motion posture matches the real-time target motion posture, the electronic device determines that the second camera lens locks the target object.

In other words, when the target object is in the moving state, the electronic device may display the first prompt information based on the real-time current motion posture and the real-time target motion posture, and determine whether the long-focus camera lens locks the target object.

According to another aspect, an embodiment of this application provides an electronic device. The electronic device includes one or more processors; a memory, where the memory stores code; and a touchscreen, configured to: detect a touch operation and display a screen. When the code is executed by the one or more processors, the electronic device is enabled to perform the following steps: starting a camera; respectively collecting a first preview picture and a second preview picture by using a first camera lens and a second camera lens, where the second camera lens is a long-focus camera lens, and a framing range of the first camera lens is greater than a framing range of the second camera lens; displaying a first preview screen, where the first preview screen includes a first viewfinder frame, a second viewfinder frame, and a third viewfinder frame, the first viewfinder frame is used to display the first preview picture, a picture in the second viewfinder frame is a part of the first preview picture, content in the second viewfinder frame is a target object to be shot by the second camera lens, and the third viewfinder frame is used to display the second preview picture; and displaying first prompt information, where the first prompt information is used to guide a user to move the electronic device, so that the second camera lens can lock the target object after the electronic device is moved.

In a possible implementation, when the code is executed by the one or more processors, the electronic device is further enabled to perform the following steps: after the displaying a first preview screen, detecting a dragging operation performed on the second viewfinder frame by the user; and moving the second viewfinder frame on the first preview picture in response to the dragging operation, where the target object changes with a location of the second viewfinder frame.

In another possible implementation, when the code is executed by the one or more processors, the electronic device is further enabled to perform the following step: when the second viewfinder frame approaches the third viewfinder frame, moving the third viewfinder frame to keep away from the second viewfinder frame.

In another possible implementation, the first prompt information is used to indicate a moving direction and a moving distance of the electronic device.

In another possible implementation, the first prompt information is an arrow, a direction of the arrow is used to indicate a moving direction, and a length of the arrow is used to indicate a moving distance. After the electronic device is moved in the direction indicated by the arrow, the length of the arrow becomes shorter.

In another possible implementation, a smaller size of the second viewfinder frame indicates a larger zoom ratio of the second preview picture in the third viewfinder frame, and a larger size of the second viewfinder frame indicates a smaller zoom ratio of the second preview picture in the third viewfinder frame. When the code is executed by the one or more processors, the electronic device is further enabled to perform the following steps: after the displaying a first preview screen, detecting an operation of adjusting a size of the second viewfinder frame by the user; adjusting the size of the second viewfinder frame; determining a zoom ratio based on the adjusted size of the second viewfinder frame; and displaying the second preview picture in the third viewfinder frame based on the zoom ratio.

In another possible implementation, when the code is executed by the one or more processors, the electronic device is further enabled to perform the following step: after the displaying first prompt information, if the electronic device determines that the second camera lens locks the target object, displaying a second preview screen, where the second preview screen is used to display the second preview picture collected by the second camera lens.

In another possible implementation, when the code is executed by the one or more processors, the electronic device is further enabled to perform the following step: after the displaying a second preview screen, automatically taking a picture.

In another possible implementation, the automatically taking a picture includes: if the electronic device determines that the second camera lens locks the target object, automatically taking a picture. When the code is executed by the one or more processors, the electronic device is further enabled to perform the following step: if the electronic device determines that the second camera lens does not lock the target object, displaying the first prompt information.

In another possible implementation, when the code is executed by the one or more processors, the electronic device is further enabled to perform the following steps: after the automatically taking a picture, if the electronic device determines that the second camera lens does not lock the target object, displaying the first prompt information; and taking a picture after detecting an operation of instructing shooting by the user.

In another possible implementation, when the code is executed by the one or more processors, the electronic device is further enabled to perform the following step: after the displaying a second preview screen, taking a picture after detecting an operation of instructing shooting by the user.

In another possible implementation, when the code is executed by the one or more processors, the electronic device is further enabled to perform the following steps: after the displaying a second preview screen, if the electronic device determines that the second camera lens does not lock the target object, displaying the first prompt information; and taking a picture after detecting an operation of instructing shooting by the user.

In another possible implementation, when the code is executed by the one or more processors, the electronic device is further enabled to perform the following step: if the electronic device determines that the second camera lens locks the target object, stopping displaying the first prompt information.

In another possible implementation, when the code is executed by the one or more processors, the electronic device is further enabled to perform the following step: if the electronic device determines that the second camera lens locks the target object, displaying second prompt information, where the second prompt information is used to indicate to the user that the second camera lens locks the target object.

In another possible implementation, when the code is executed by the one or more processors, the electronic device is further enabled to perform the following step: before the displaying first prompt information, when the second camera lens locks the target object, calculating a corresponding target motion posture. The displaying first prompt information includes: determining adjustment information based on a difference between a current motion posture and the target motion posture; and displaying the first prompt information based on the adjustment information. That the electronic device determines that the second camera lens locks the target object includes that, when the current motion posture matches the target motion posture, the electronic device determines that the second camera lens locks the target object.

In another possible implementation, when the code is executed by the one or more processors, the electronic device is further enabled to perform the following step: after the displaying a first preview screen, if the electronic device detects that the target object is in a moving state, moving the second viewfinder frame based on the moving state of the target object, so that the target object is in the second viewfinder frame.

In another possible implementation, when the code is executed by the one or more processors, the electronic device is further enabled to perform the following step: if the electronic device detects that the target object is in the moving state, displaying a motion mark, where the motion mark is used to indicate a moving direction and a contour of the target object.

In another possible implementation, the displaying first prompt information includes: when the second camera lens locks the target object, calculating a corresponding real-time target motion posture in real time; determining adjustment information based on a difference between a current motion posture and the real-time target motion posture; and displaying the first prompt information based on the adjustment information. That the electronic device determines that the second camera lens locks the target object includes that, when the current motion posture matches the real-time target motion posture, the electronic device determines that the second camera lens locks the target object.

According to another aspect, an embodiment of this application provides a shooting apparatus. The apparatus is included in an electronic device, and the apparatus has a function of implementing actions of the electronic device in any method in the foregoing aspects and the possible implementations. The function may be implemented by using hardware, or may be implemented by hardware executing corresponding software. The hardware or the software includes at least one module or unit corresponding to the foregoing function, for example, a start module or unit, a collecting module or unit, a display module or unit, a processing module or unit, a moving module or unit, or a shooting module or unit.

According to another aspect, an embodiment of this application provides a computer storage medium, including a computer instruction. When the computer instruction is run on an electronic device, the electronic device is enabled to perform the shooting method in any possible implementation of the foregoing aspects.

According to still another aspect, an embodiment of this application provides a computer program product. When the computer program product is run on a computer, the computer is enabled to perform the shooting method in any possible implementation of the foregoing aspects.

DESCRIPTION OF EMBODIMENTS

Figure 1A:
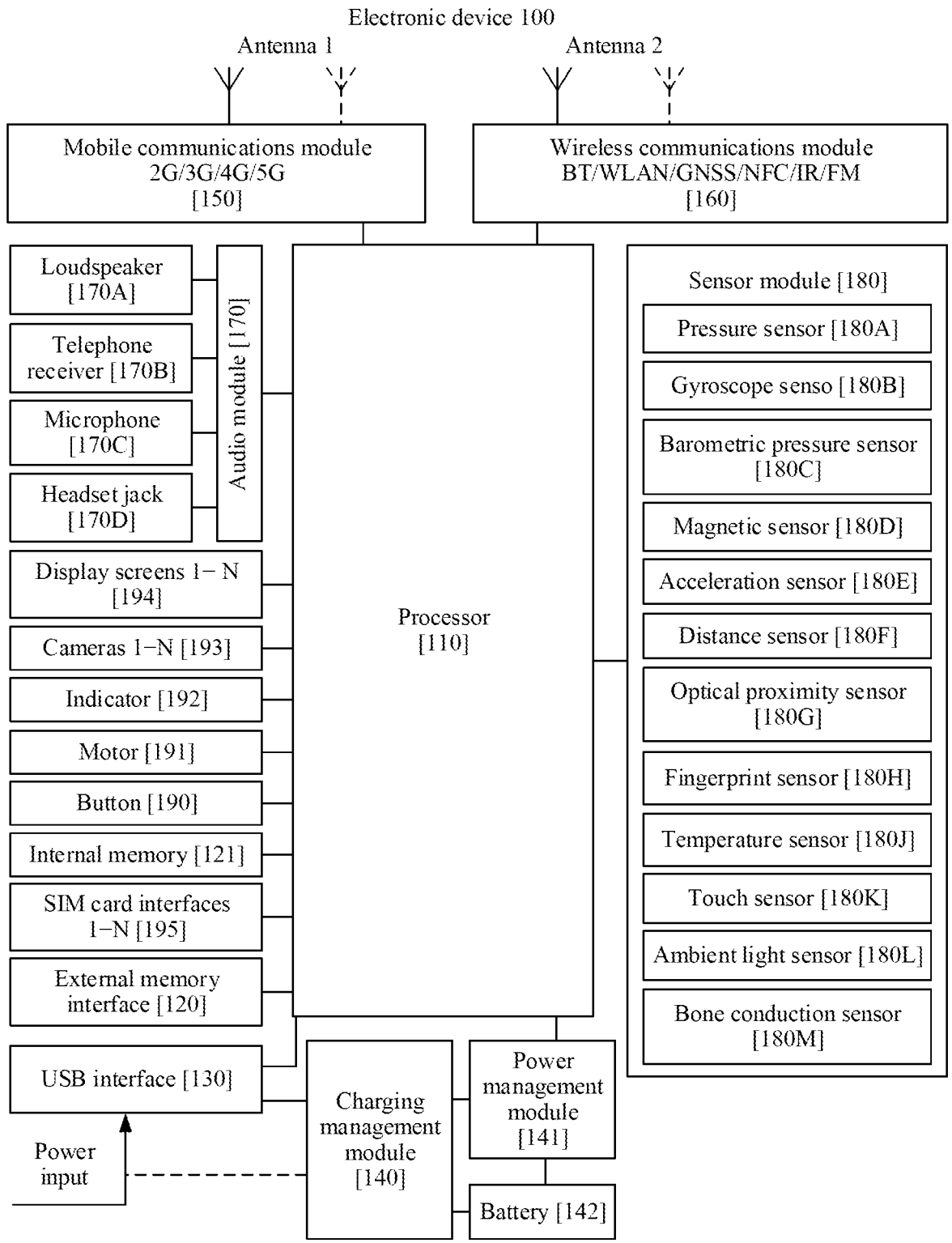
FIG. 1A is a schematic structural diagram of an electronic device according to an embodiment of this application.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

A framing range of a long-focus camera lens is small, and a size of an object in a picture taken by the long-focus camera lens is relatively large. The long-focus camera lens may be used to shoot a distant object, a close-up scenario, or object details, or dedicatedly shoot a relatively small object. A wide-angle camera lens and a middle-focus camera lens have relatively large framing ranges, and can be used to shoot an object and take a picture in a relatively large range.

When another camera lens such as a wide-angle camera lens or a middle-focus camera lens is switched to a long-focus camera lens to perform shooting, an electronic device is prone to lose a to-be-shot target object. In other words, it is difficult for the electronic device to lock the target object by using the long-focus camera lens. A user cannot see the target object in a preview screen of the long-focus camera lens. In the prior art, after the target object is lost, the user does not know a specific location of the target object, and therefore, usually blindly tries to search the surrounding and expects to find the target object. In addition, because the framing range (or referred to as a shooting angle range) of the long-focus camera lens is small, and the target object is usually far away from the user, the user is prone to miss the target object during the searching. Therefore, it is usually hard for the user to find the target object even after consuming a relatively long time and a lot of energy.

An embodiment of this application provides a shooting method that may be applied to an electronic device. For example, the electronic device may be specifically a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, a personal digital auxiliary (personal digital auxiliary, PDA), or a dedicated camera (for example, a single-lens reflex camera, or a card-type camera). A specific type of the electronic device is not limited in this embodiment of this application.

In this embodiment of this application, the user may specify a target object in a shooting scenario. After the electronic device switches from the another camera lens such as a wide-angle camera lens or a middle-focus camera lens to the long-focus camera lens, the electronic device may guide, based on the target object specified by the user, the user to move the electronic device. The user may move the electronic device according to the guidance, so that the long-focus camera lens can quickly lock the target object after the electronic device is moved. Further, the electronic device can take a picture of the target object by using the long-focus camera lens.

For example, FIG. 1A is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera lens 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a schematic structure in this embodiment of this application constitutes no specific limitation on the electronic device 100. In some other embodiments of this application, the electronic device 100 may include more or fewer components than those shown in the figure; or in the electronic device 100, some components may be combined, or some components may be split, or components are arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, to store an instruction and data. In some embodiments, the memory in the processor 110 is a cache. The memory may store an instruction or data that is used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derial clock line, SCL). In some embodiments, the processor 110 may include a plurality of groups of I2C buses. The processor 110 may be separately coupled to the touch sensor 180K, a charger, a flash, the camera lens 193, and the like by using different I2C bus interfaces. For example, the processor 110 may be coupled to the touch sensor 180K by using an I2C interface, so that the processor 110 communicates with the touch sensor 180K by using an I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transmit an audio signal to the wireless communications module 160 by using an I2S interface, to implement a function of answering a call by using a Bluetooth headset.

The PCM interface may also be configured to: perform audio communication, and perform sampling, quantization, and encoding on an analog signal. In some embodiments, the audio module 170 may be coupled to the wireless communications module 160 by using a PCM bus interface. In some embodiments, the audio module 170 may also transmit an audio signal to the wireless communications module 160 by using a PCM interface, to implement a function of answering a call by using a Bluetooth headset. Both the I2S interface and the PCM interface may be configured to perform audio communication.

The UART interface is a universal serial data line, and is configured to perform asynchronous communication. The bus may be a two-way communications bus. The UART interface switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral component such as the display screen 194 or the camera lens 193. The MIPI interface includes a camera serial interface (camera serial interface, CSI), a display serial interface (display serial interface, DSI), and the like. In some embodiments, the processor 110 communicates with the camera lens 193 by using the CSI interface, to implement a shooting function of the electronic device 100. The processor 110 communicates with the display screen 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect to the processor 110, the camera lens 193, the display screen 194, the wireless communications module 160, the audio module 170, the sensor module 180, and the like. The GPIO interface may be further configured as an I2C interface, an I2S interface, a UART interface, an MIPI interface, or the like.

The USB interface 130 is an interface that meets a USB standard specification, and may be specifically a mini USB interface, a micro USB interface, a USB type-C interface, or the like. The USB interface 130 may be configured to connect to the charger to charge the electronic device, or may be configured to transmit data between the electronic device 100 and a peripheral device, or may be configured to connect to a headset, to play audio by using the headset. The interface may be further configured to connect to another electronic device such as an AR device.

It may be understood that a schematic interface connection relationship between the modules in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger, or may be a wired charger. In some embodiments of the wired charger, the charging management module 140 may receive a charging input from the wired charger by using the USB interface 130. In some embodiments of the wireless charger, the charging management module 140 may wirelessly receive a charging input by using a wireless charging coil of the electronic device 100. When charging the battery 142, the charging management module 140 may further supply power to the electronic device by using the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera lens 193, the wireless communications module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into an intermediate/or a high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the loudspeaker 170A, the telephone receiver 170B, and the like), or displays a picture or a video by using the display screen 194. In some embodiments, the modem processor may be an independent component. In some other embodiments, the modem processor may be independent of the processor 110, and the modem processor and the mobile communications module 150 or another function module may be disposed in a same component.

The wireless communications module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components into which at least one communication processing module is integrated. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements the display function by using the GPU, the display screen 194, the application processor, and the like. The GPU is a microprocessor for picture processing, and connects to the display screen 194 and the application processor. The GPU is configured to perform mathematical and geometrical calculation, and is configured to perform graphics rendering. The processor 110 may include one or more GPUs, and execute a program instruction to generate or change display information.

The display screen 194 is configured to display a picture, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Mini-LED, a MicroLED, a Micro-OLED, a quantum dot light emitting diode (quantum dot light emitting diodes, QLED), and the like. In some embodiments, the electronic device 100 may include one or N display screens 194, where N is a positive integer greater than 1.

In a shooting scenario, the display screen 194 may be used to display a preview picture collected by a camera lens. In some embodiments, the display screen 194 may be used to display an assist viewfinder frame, a target viewfinder frame, and a real-time viewfinder frame. The assist viewfinder frame is used to display an assist preview picture. The assist preview picture is a preview picture collected by an assist camera lens other than a long-focus camera lens. For example, the assist camera lens is a wide-angle camera lens or a middle-focus camera lens. The target viewfinder frame is used to display a target object that is to be shot by the long-focus camera lens and that is specified in the assist preview picture by the user. The real-time viewfinder frame is used to display a preview picture collected in real time by the long-focus camera lens.

In some other embodiments, the display screen 194 may be further used to display prompt information to guide the user to move the electronic device 100, so that the moved electronic device 100 can use the long-focus camera lens to quickly lock the target object to take a picture.

The electronic device 100 may implement the shooting function by using the ISP, the camera lens 193, the video codec, the GPU, the display screen 194, the application processor, and the like.

The ISP is configured to process data fed back by the camera lens 193. For example, during photographing, a shutter is pressed, and a ray of light is transmitted to a light-sensitive element through a lens. An optical signal is converted into an electrical signal. The light-sensitive element of the camera lens transmits the electrical signal to the ISP for processing, and converts the electrical signal into a picture that can be seen. The ISP may further perform algorithm optimization on noise, luminance, and complexion of the picture. The ISP may further optimize parameters of a shooting scenario such as exposure and a color temperature. In some embodiments, the ISP may be disposed in the camera lens 193.

The camera lens 193 is configured to capture a static picture or a video. An optical picture of an object is generated through the lens, and the picture is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital picture signal. The ISP outputs the digital picture signal to the DSP for processing. The DSP converts the digital picture signal into a picture signal in a standard format such as RGB or YUV. In some embodiments, the electronic device 100 may include N camera lenses 193, where N is a positive integer greater than 1.

The N camera lenses may include a plurality of rear-facing camera lenses. The N camera lenses may further include one or more front-facing camera lenses. Alternatively, the camera lens may be a pop-up camera lens.

The N camera lenses may include a plurality of types of camera lenses. For example, the N camera lenses may include one or more of a long-focus camera lens, a wide-angle camera lens, a middle-focus camera lens, a time of flight (time of flight, ToF) camera lens, or the like. The wide-angle camera lens may include an ultra wide camera lens with a very large framing range.

The N camera lenses may include camera lenses with different focal lengths. The focal lengths may include but are not limited to a first focal length (also referred to as a short focal length) that is less than a preset value 1 (for example, 35 mm), a second focal length (also referred to as a middle focal length) that is greater than or equal to the preset value 1 and less than or equal to a preset value 2 (for example, 85 mm), and a third focal length (also referred to as a long focal length) that is greater than the preset value 2. A framing range for shooting performed by a camera lens with the first focal length is relatively large, and the camera lens with the first focal length may be a wide-angle camera lens. A framing range for shooting performed by a camera lens with the third focal length is relatively small, and the camera lens with the third focal length may be a long-focus camera lens. A framing range for shooting performed by a camera lens with the second focal length is of a middle size, and the camera lens with the second focal length may be a middle-focus camera lens.

Figure 1B:
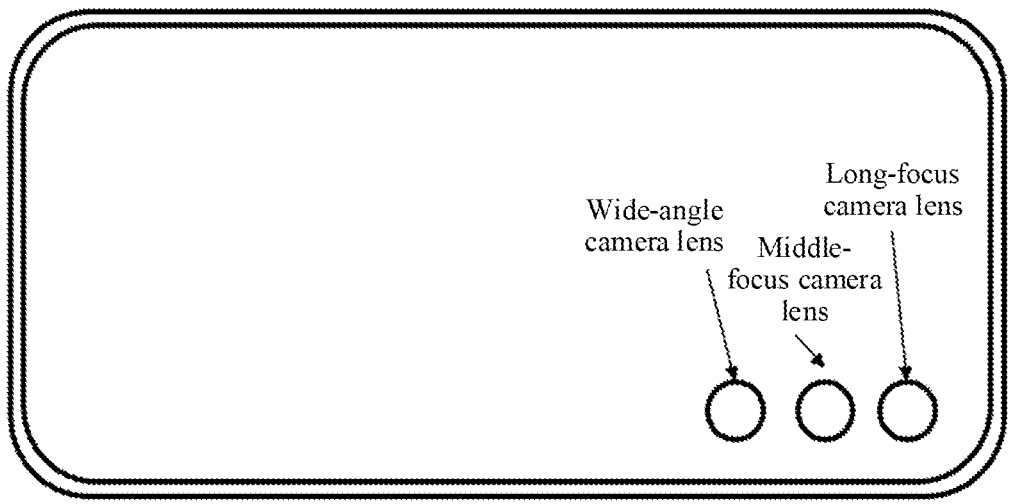
FIG. 1B is a schematic diagram of distribution of camera lenses according to an embodiment of this application.

For example, when the electronic device 100 includes a wide-angle camera lens, a middle-focus camera lens, and a long-focus camera lens, reference may be made to FIG. 1B for a schematic diagram of distribution of the three camera lenses. For framing ranges for shooting performed by the three camera lenses, refer to FIG. 1C.

The digital signal processor is configured to process a digital signal. In addition to a digital picture signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, picture recognition, facial recognition, voice recognition, and text understanding.

The external memory interface 120 may be configured to connect to an external storage card such as a micro SD card, to extend a storage capability of the electronic device 100. The external storage card communicates with the processor 110 by using the external memory interface 120, to implement a data storage function. For example, a file such as a music file or a video file is stored in the external storage card.

The internal memory 121 may be configured to store computer executable program code. The executable program code includes an instruction. The processor 110 runs the instruction stored in the internal memory 121, to perform various function applications and data processing of the electronic device 100. The internal memory 121 may include a program storage region and a data storage region. The program storage region may store an operating system, an application program required by at least one function (for example, a voice playing function or a picture playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

The electronic device 100 may implement an audio function such as music playing or recording by using the audio module 170, the loudspeaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The loudspeaker 170A is also referred to as a "speaker", and is configured to convert an audio electrical signal into a sound signal. The electronic device 100 may be used to listen to music or answer a call in a hands-free mode by using the loudspeaker 170A.

The telephone receiver 170B is also referred to as a "receiver", and is configured to convert an audio electrical signal into a sound signal. When the electronic device 100 is used to answer a call or receive voice information, the telephone receiver 170B may be put close to a human ear, to receive the voice information.

The microphone 170C is configured to convert a sound signal into an electrical signal. When making a call or sending voice information, a user may speak with the mouth approaching the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There is a plurality of types of pressure sensors 180A, for example, a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a location of the touch based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a real-time current motion posture of the electronic device 100 (for example, a tilt angle and a location of the electronic device 100). In some embodiments, the gyroscope sensor 180B may be used to determine angular velocities of the electronic device 100 around three axes (namely, axes x, y, and z). The gyroscope sensor 180B may be configured to implement picture stabilization during shooting. For example, when the shutter is pressed, the gyroscope sensor 180B detects a uttering angle of the electronic device 100, calculates, based on the angle, a distance for which a lens module needs to compensate, and enables the lens to offset uttering of the electronic device 100 through reverse motion, to implement picture stabilization. The gyroscope sensor 180B may be further used in a navigation scenario and a motion sensing game scenario.

Figure 1C:
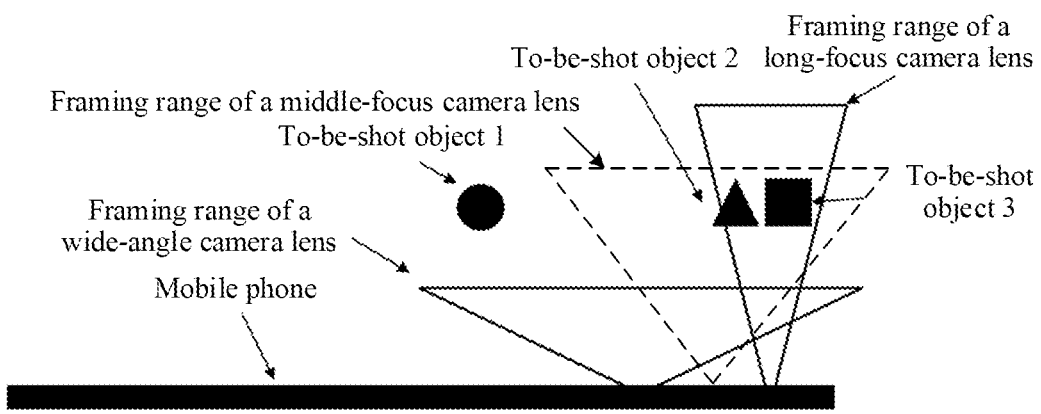
FIG. 1C is a schematic diagram of framing ranges of a group of different camera lenses according to an embodiment of this application.

Different motion postures of the electronic device 100 indicate different content shot by the camera lens in the electronic device 100. For example, when FIG. 1C is compared with FIG. 1D, it may be learned that content that can be shot by the wide-angle camera lens and the long-focus camera lens also changes as a motion posture of the electronic device 100 changes.

In order that the long-focus camera lens shoots the target object, the motion posture of the electronic device 100 may be changed by moving the electronic device 100, to change content that can be shot by the long-focus camera lens, so that the target object falls within the framing range of the long-focus camera lens.

In some embodiments, the processor 110 may determine, based on the target object in the target viewfinder frame specified by the user, a target motion posture corresponding to the electronic device 100 when the target object is shot by using the long-focus camera lens. The processor 110 may further prompt the user based on a difference between the real-time current motion posture and the target motion posture of the electronic device 100, to guide the user to move the electronic device 100 based on the prompt. In this way, the electronic device 100 can quickly lock the target object by using the long-focus camera lens after the movement, to take a picture.

In some other embodiments, when the target object moves, the processor 110 may further track the moving target object by using a picture recognition technology, and determine a real-time target motion posture corresponding to the electronic device 100 when the moving target object is shot by using the long-focus camera lens. The processor 110 may further prompt the user based on the difference between the real-time current motion posture and the real-time target motion posture, to guide the user to move the electronic device 100 based on the prompt. In this way, the electronic device 100 can quickly lock the target object by using the long-focus camera lens after the movement, to take a picture.

The barometric pressure sensor 180C is configured to measure atmospheric pressure. In some embodiments, the electronic device 100 calculates an altitude based on a value of the atmospheric pressure measured by the barometric pressure sensor 180C, to assist positioning and navigation.

The magnetic sensor 180D includes a Hall effect sensor. The electronic device 100 may detect opening and closing of a flip leather cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking of the flip cover is set based on a detected open/closed state of the leather cover or a detected open/closed state of the flip cover.

The acceleration sensor 180E may detect a value of acceleration of the electronic device 100 in various directions (usually on three axes). When the electronic device 100 is static, a value and a direction of gravity may be detected. The electric device 100 may be further configured to recognize a posture of the electronic device, and applied to applications such as landscape/portrait orientation switching and a pedometer.

The distance sensor 180F is configured to measure a distance. The electronic device 100 may measure a distance through infrared or laser. In some embodiments, in a shooting scenario, the electronic device 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The electronic device 100 may emit infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user puts the electronic device 100 close to an ear for conversation, so that screen-off is automatically implemented to save power. The optical proximity sensor 180G may be further configured to automatically unlock and lock the screen in a leather cover mode and a pocket mode.

The ambient light sensor 180L is configured to sense luminance of ambient light. The electronic device 100 may adaptively adjust luminance of the display screen 194 based on the sensed luminance of the ambient light. The ambient light sensor 180L may be further configured to automatically adjust white balance during photographing. The ambient light sensor 180L may further cooperate with the optical proximity sensor 180G to detect whether the electronic device 100 is in a pocket, thereby preventing an accidental touch.

The fingerprint sensor 180H is configured to collect a fingerprint. The electronic device 100 may implement fingerprint unlock, application access lock, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch panel". The touch sensor 180K may be disposed in the display screen 194, and the touch sensor 180K and the display screen 194 constitute a touchscreen that is also referred to as a "touch control screen". The touch sensor 180K is configured to detect a touch operation performed on or near the touch sensor 180K. The touch sensor may transmit the detected touch operation to the application processor, to determine a touch event type. The touch sensor 180K may provide, by using the display screen 194, a visual output related to the touch operation. In some other embodiments, the touch sensor 180K may be alternatively disposed on a surface of the electronic device 100, and is located at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may contact a human pulse, and receive a blood pressure beating signal. In some embodiments, the bone conduction sensor 180M may be alternatively disposed in a headset, to obtain a bone conduction headset. The audio module 170 may parse out a voice signal based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power-on button, a volume button, and the like. The button 190 may be a mechanical button, or may be a touch key. The electronic device 100 may receive a button input, and generate a button signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photographing and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging status and a battery change, and may be further configured to indicate a message, a missed call, a notification, and the like.

The SIM card interface 195 is configured to connect to a SIM card. The SIM card may be inserted into the SIM card interface 195 or detached from the SIM card interface 195, to implement contact with and detaching from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at the same time. The plurality of cards may be of a same type or different types. The SIM card interface 195 may be alternatively compatible with different types of SIM cards. The SIM card interface 195 may be also compatible with an external storage card. The electronic device 100 interacts with a network by using a SIM card, to implement functions such as conversation and data communication. In some embodiments, the electronic device 100 uses an eSIM, namely, an embedded SIM card. The eSIM card may be embedded into the electronic device 100, and cannot be detached from the electronic device 100.

In this embodiment of this application, the user may specify the target object to be shot by the long-focus camera lens. Sensors such as the gyroscope sensor 180B may determine the real-time current motion posture of the electronic device 100 in real time. The processor 110 may determine, based on the target object in the target viewfinder frame specified by the user, the target motion posture corresponding to the electronic device 100 when the target object is shot by using the long-focus camera lens. The processor 110 may further prompt the user based on the difference between the real-time current motion posture and the real-time target motion posture, to guide the user to move the electronic device 100 based on the prompt. In this way, the electronic device 100 can quickly lock the target object by using the long-focus camera lens after the movement, to take a picture.

The following describes the shooting method provided in this embodiment of this application by using an example in which the electronic device having the structure shown in FIG. 1A is a mobile phone and the mobile phone includes a touchscreen. As described above, the touchscreen may further include a display panel and a touch panel. The display panel may display a screen. The touch panel may detect a touch operation of a user, and report the touch operation to a processor of the mobile phone for corresponding processing.

In some embodiments, when using the mobile phone to take a picture, the user may use a manner such as a touch operation, a key operation, a mid-air gesture operation, or a voice operation to instruct the mobile phone to start a camera. For example, as shown in FIG. 2A-1, after detecting an operation of tapping a camera icon 201 by the user, the mobile phone starts a camera function.

Figures 1, 2A:
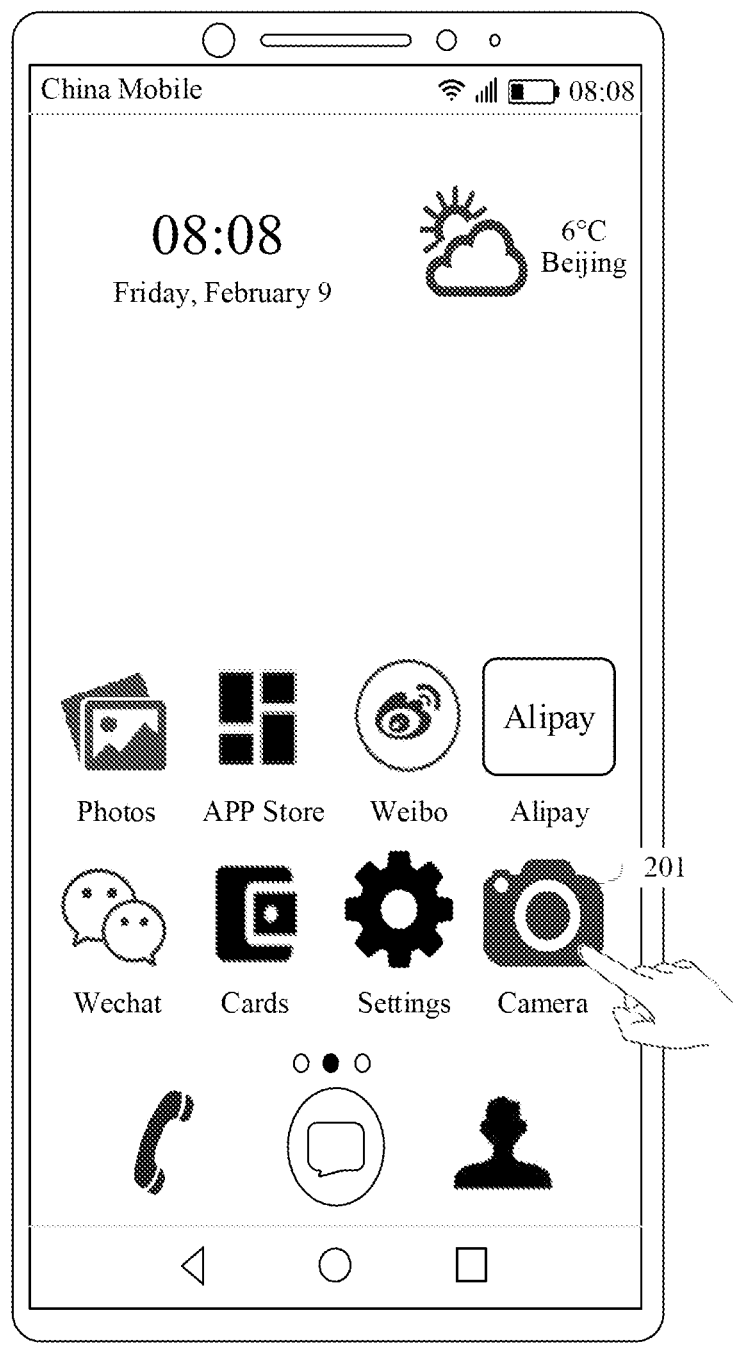
FIG. 2A-1 to FIG. 2A-3 are schematic diagrams of a group of screens of starting a camera according to an embodiment of this application.

In some embodiments, after starting the camera, the mobile phone may automatically enter a shooting mode such as a photographing mode, a video recording mode, or a telephoto assist mode, and display a preview screen For example, as shown in FIG. 2A-1, after detecting the operation of tapping the camera icon 201 by the user, the mobile phone may automatically enter the photographing mode. In an example, the mobile phone may display a preview screen 202 shown in FIG. 2A-2. In another example, a preview screen shown in FIG. 2B is displayed. The preview screen shown in FIG. 2A or FIG. 2B includes a viewfinder frame. A preview picture collected by a default camera lens may be displayed in the viewfinder frame. For example, the default camera lens may be a wide-angle camera lens.

After the mobile phone starts the camera, if the mobile phone does not enter the telephoto assist mode, the mobile phone may enter the telephoto assist mode according to an instruction of the user, or the mobile phone may automatically enter the telephoto assist mode based on a zoom ratio.

Figures 2, 2A:
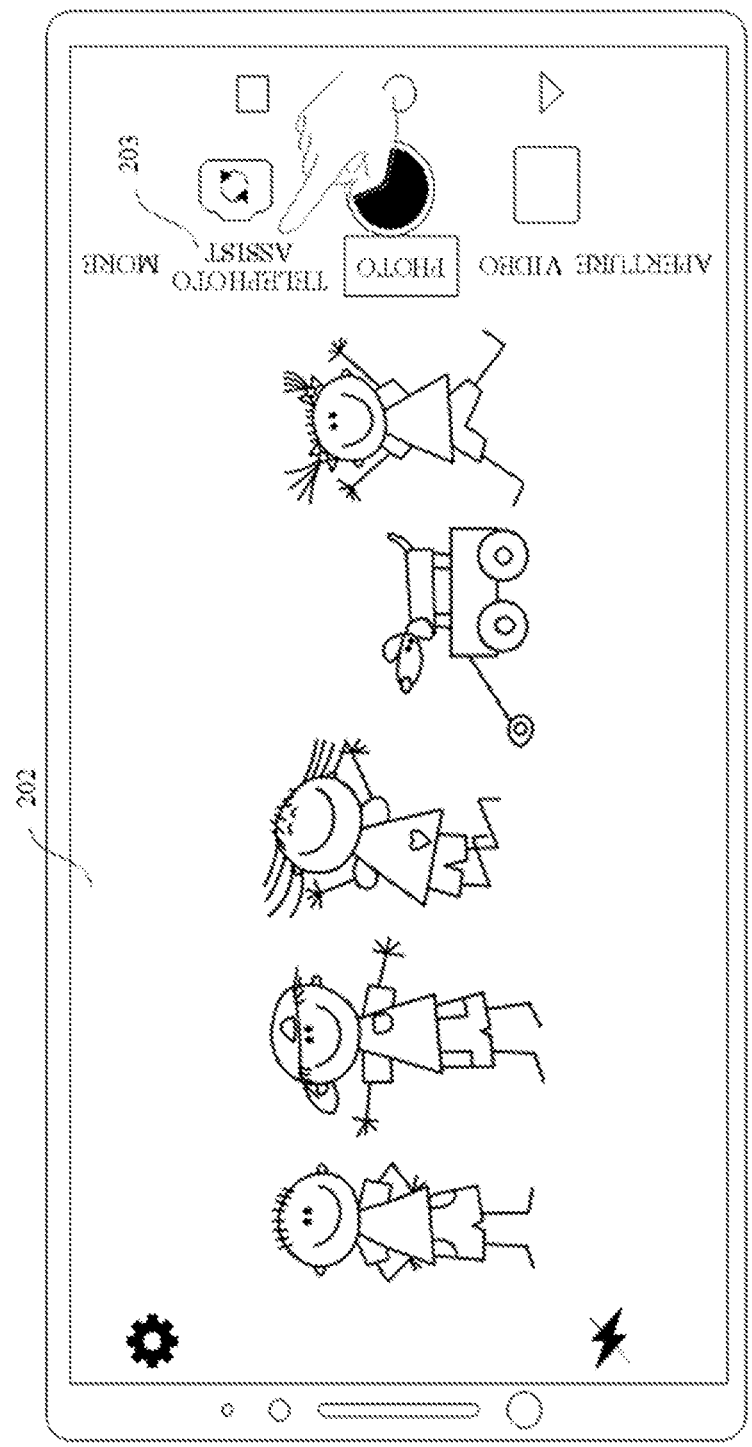

For example, if the mobile phone detects an operation of tapping a control 203 by the user in the preview screen 202 shown in FIG. 2A-2, the mobile phone may enter the telephoto assist mode.

Figures 2, 2A, 3:
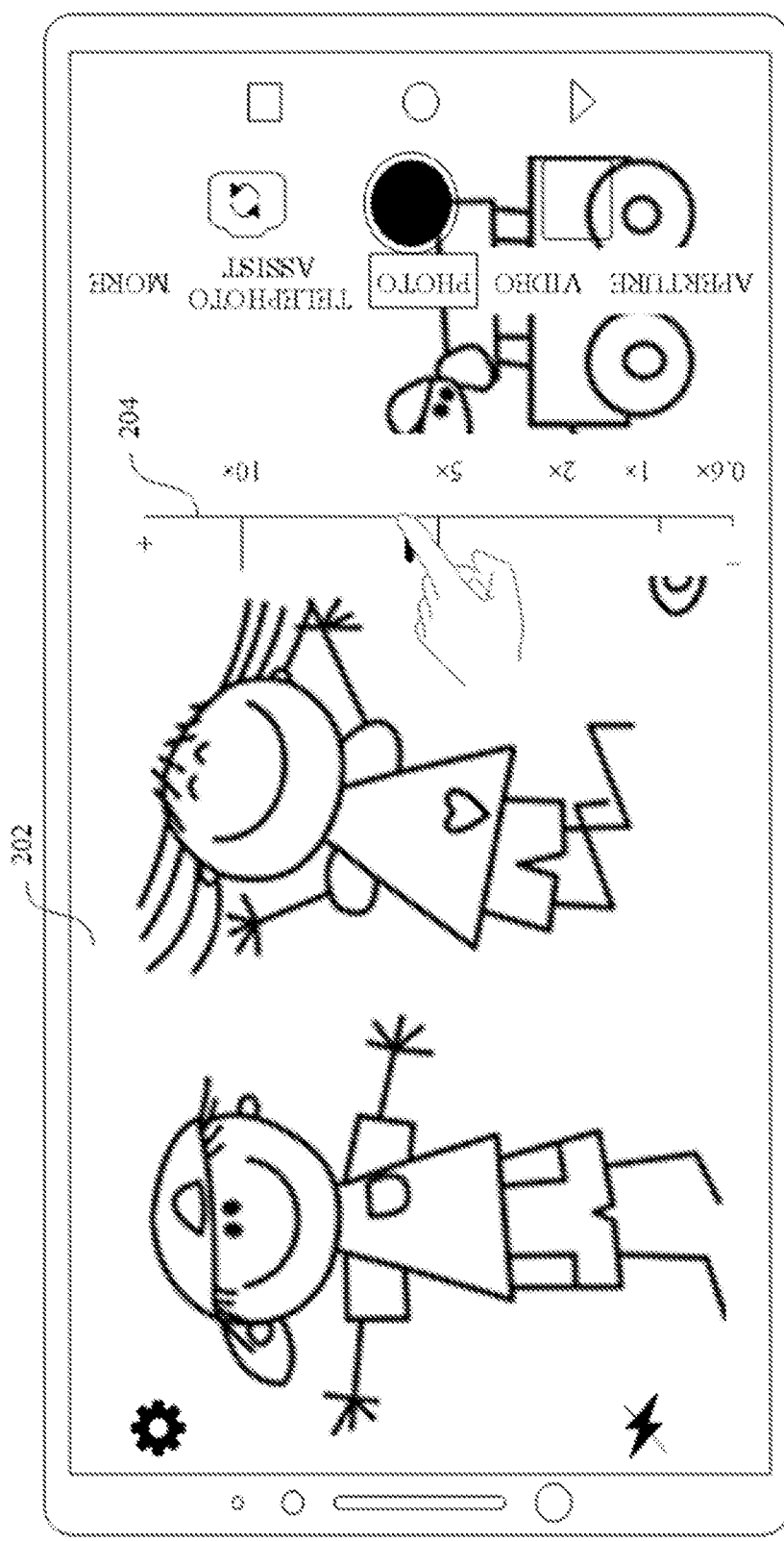
Figure 2B:
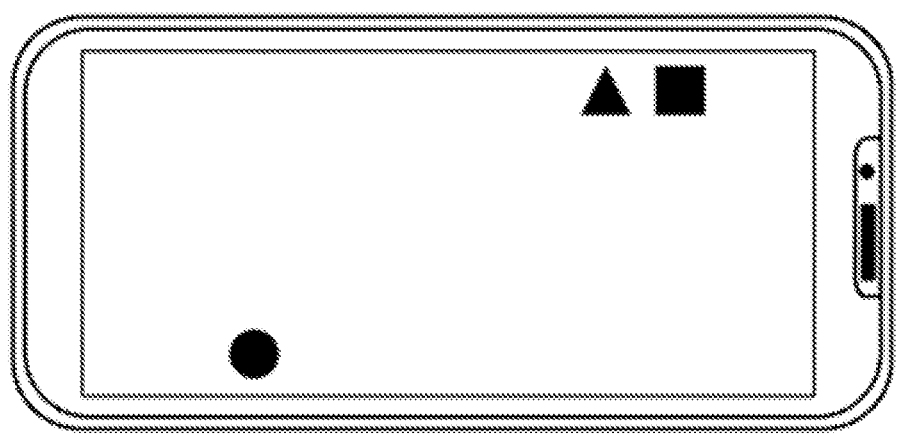
FIG. 2B is a schematic diagram of a preview screen according to an embodiment of this application.
Figure 3A:
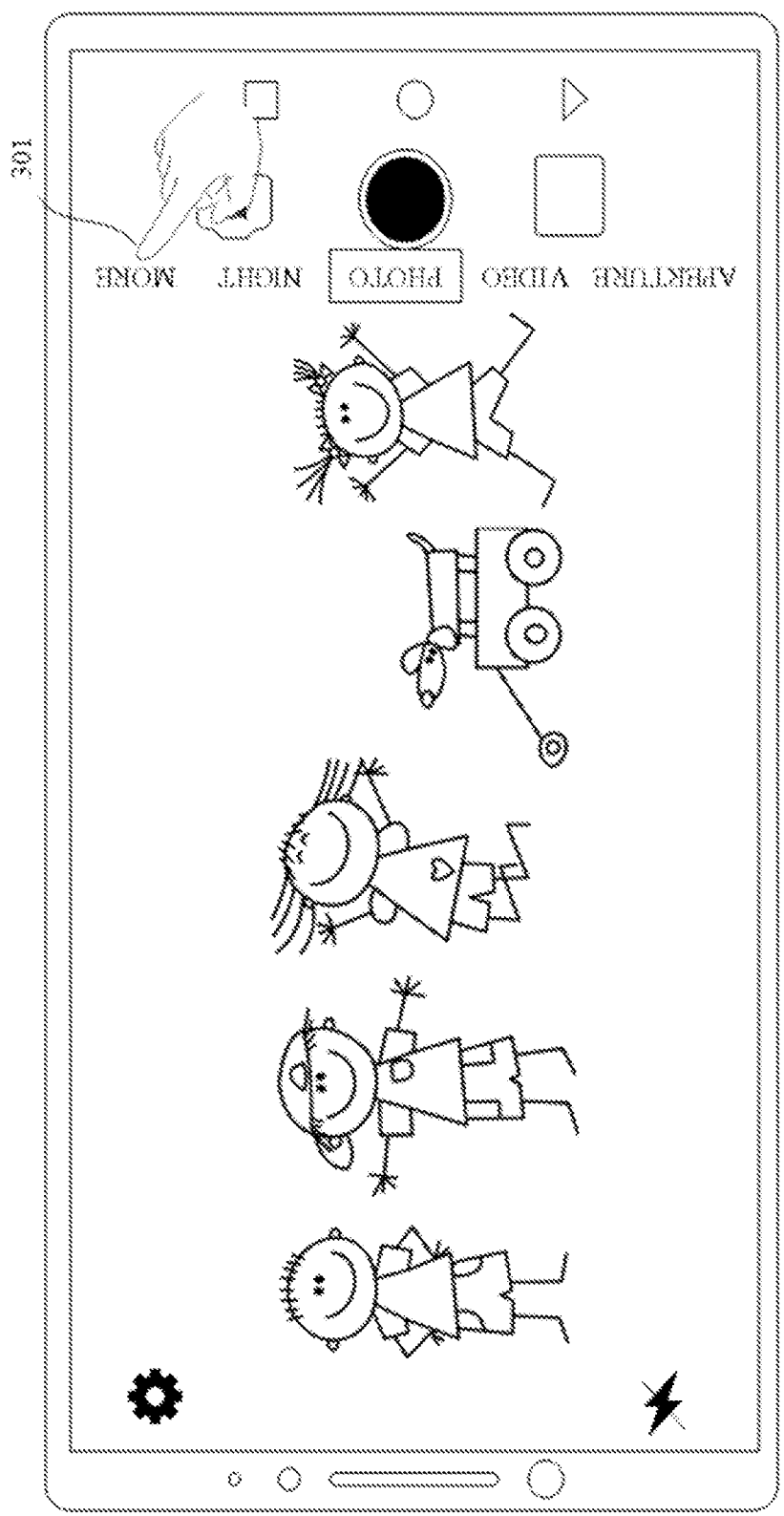
FIG. 3(a) to FIG. 3(c) are schematic diagrams of a group of pictures of entering a telephoto assist mode according to an embodiment of this application.
Figure 3B:
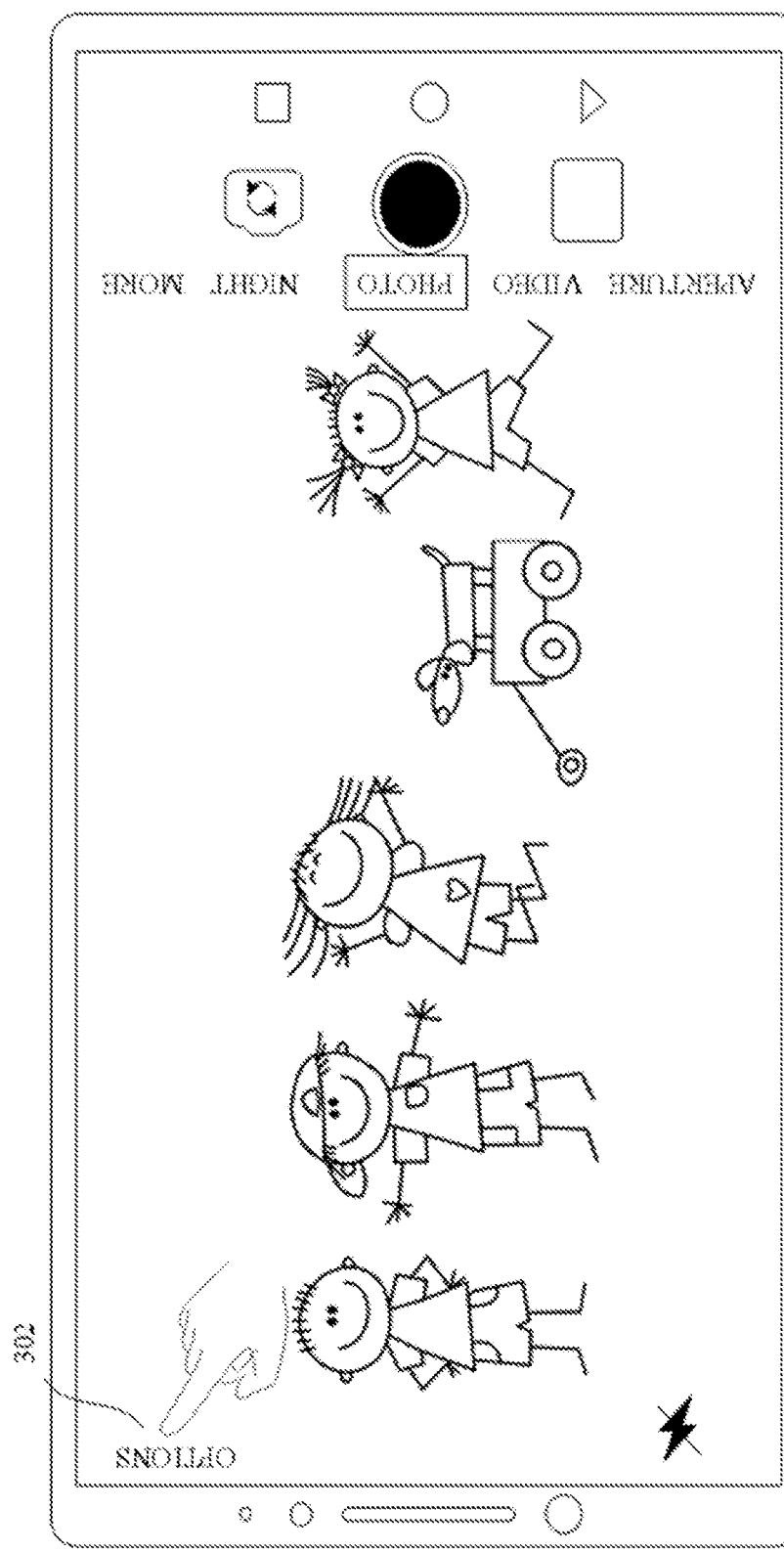
Figure 3C:
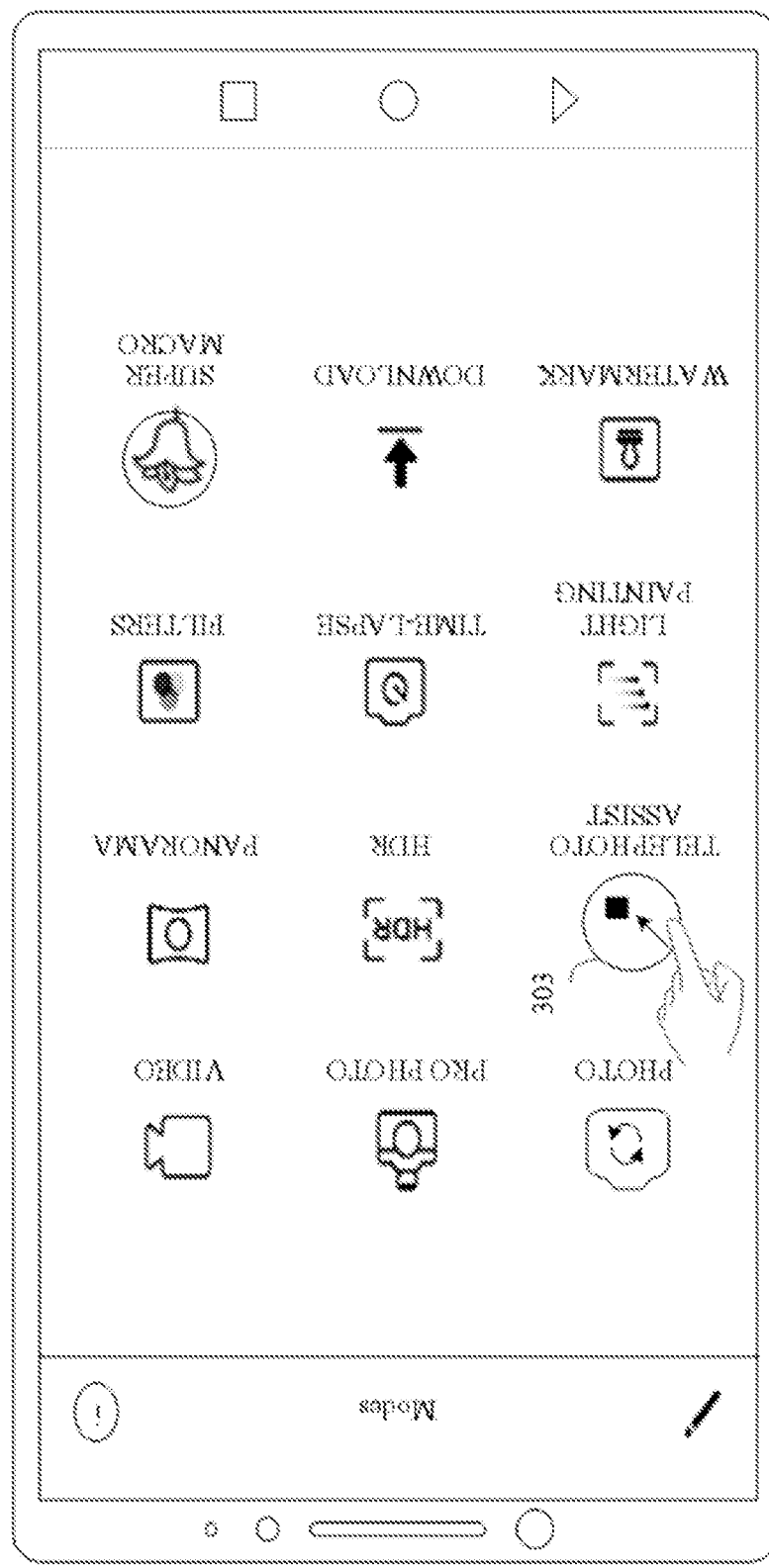

For another example, referring to FIG. 2A-3, the mobile phone detects an operation that the user instructs to increase a zoom ratio in the preview screen 202. For example, the operation of instructing to increase the zoom ratio may be an operation of dragging a zoom scale 204 in the preview screen 202 by the user, or an operation opposite to pinching performed by fingers of the user in the preview screen 202. If the increased zoom ratio is greater than or equal to a preset value 3 (for example, 5 times), the mobile phone may automatically enter the telephoto assist mode.

For another example, if the mobile phone detects an operation of tapping a control 301 by the user in a preview screen in a photographing mode shown in (a) in FIG. 3, the mobile phone may display a setting screen shown in (c) in FIG. 3. Alternatively, if the mobile phone detects an operation of tapping a control 302 by the user in a preview screen shown in (b) in FIG. 3, the mobile phone may display the setting screen shown in (c) in FIG. 3. Then, if the mobile phone detects an operation of tapping a control 303 by the user, the mobile phone enters the telephoto assist mode.

Figure 4A:
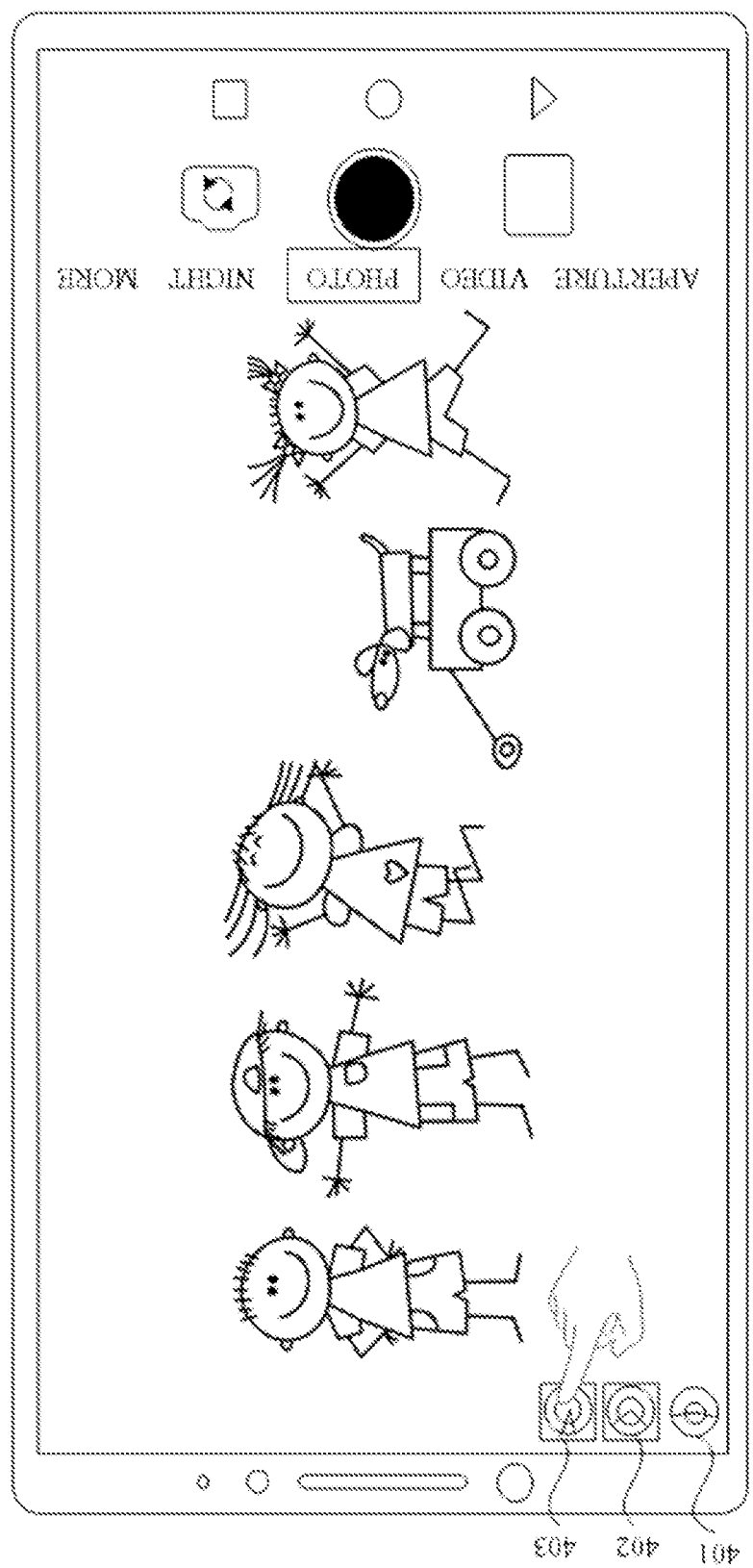
FIG. 4A to FIG. 4C are schematic diagrams of another group of pictures of entering a telephoto assist mode according to an embodiment of this application.

For another example, in the photographing mode, the preview screen displayed on the mobile phone may include an identifier of a camera lens. After detecting an operation of selecting an identifier of a long-focus camera lens by the user, the mobile phone determines that the user selects the long-focus camera lens to take a picture, and enters the telephoto assist mode. For example, referring to FIG. 4A, the preview screen of the mobile phone includes an identifier 401 of a rear-facing wide-angle camera lens, an identifier 402 of a rear-facing middle-angle camera lens, an identifier 403 of a rear-facing long-focus camera lens 403, and the like. After the mobile phone detects an operation of tapping the identifier 403 by the user, the mobile phone enters the telephoto assist mode.

Figure 4B:
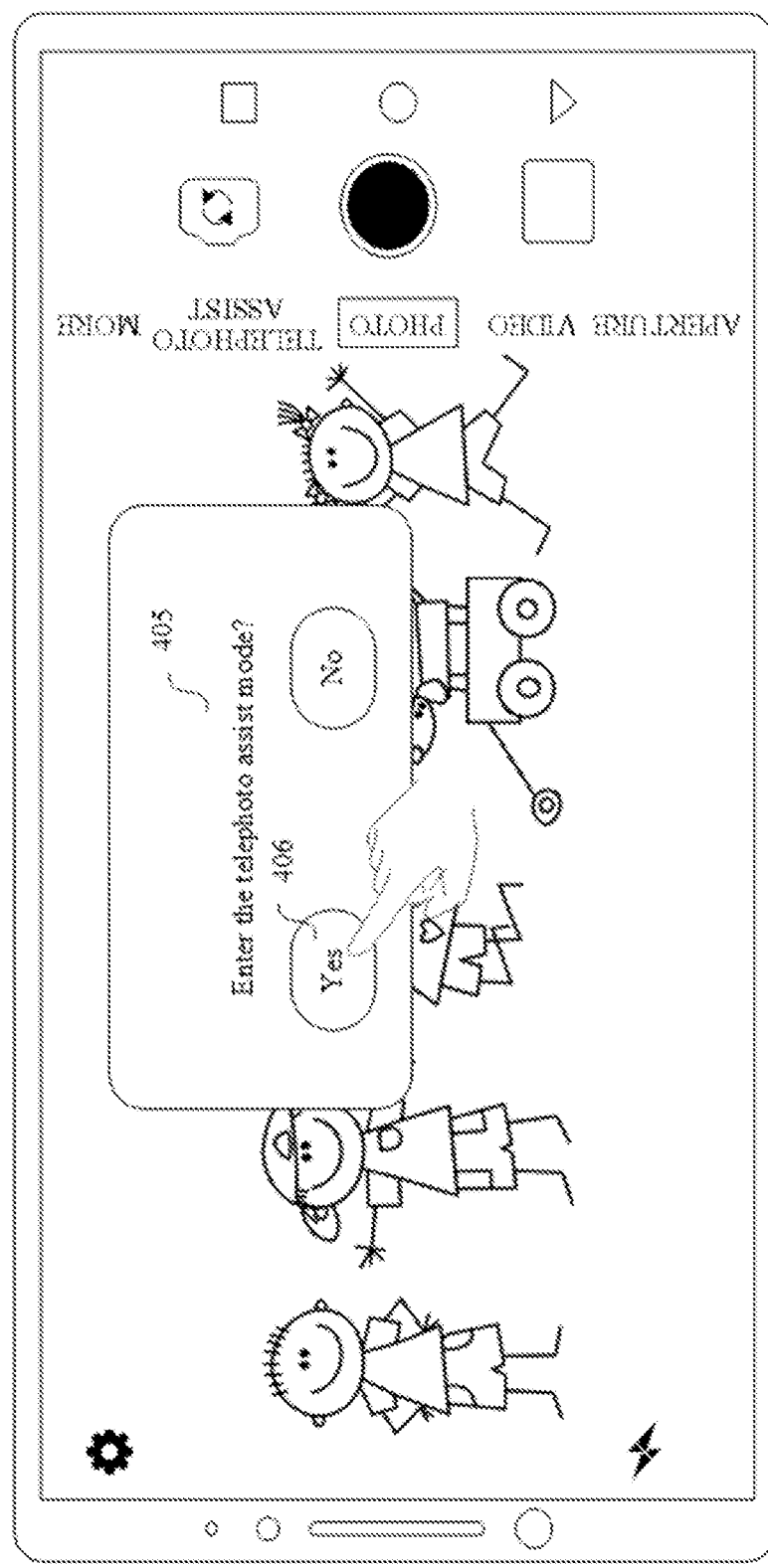

For another example, in the photographing mode, the mobile phone may prompt the user whether to enter the telephoto assist mode. Alternatively, in the photographing mode, after the mobile phone determines that the user selects the long-focus camera lens to take a picture, the mobile phone may prompt the user whether to enter the telephoto assist mode. For example, referring to FIG. 4B, the mobile phone may display information 405 to prompt the user. After the mobile phone detects an operation of tapping a control 406 by the user, the mobile phone may enter the telephoto assist mode.

For another example, in the photographing mode or the video recording mode, after the mobile phone detects an operation of drawing a preset track 1 (for example, an "F" track) on the touchscreen by the user, the mobile phone enters the telephoto assist mode.

In some other embodiments, when the mobile phone displays a home screen or displays a screen of another application, and the user wants to use the telephoto assist mode of the mobile phone, the mobile phone may implement a camera function and directly enter the telephoto assist mode according to an instruction of the user such as a touch operation, a mid-air gesture operation, a voice operation, or a key operation.

Figure 4C:
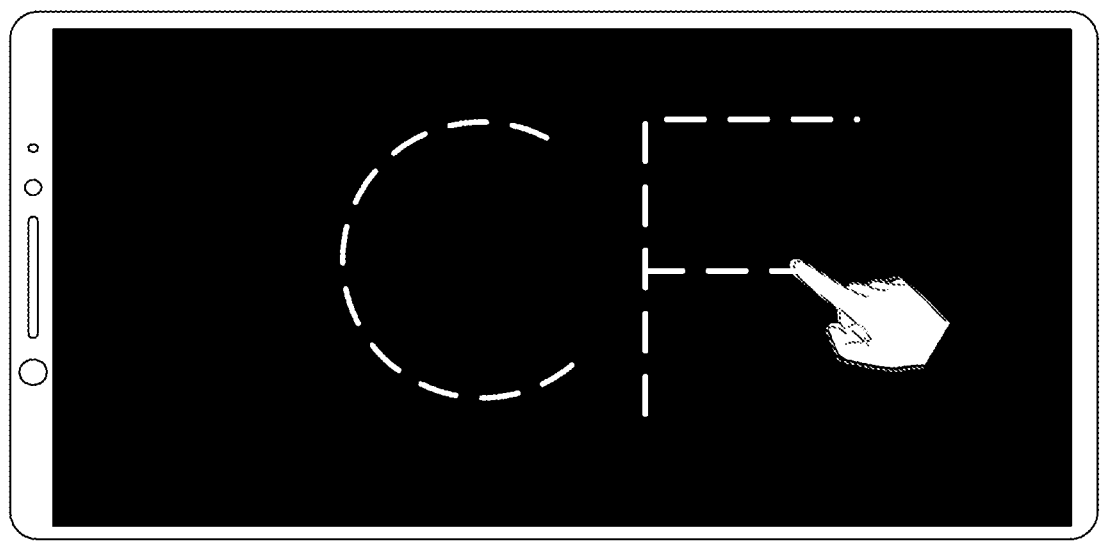

For example, when the mobile phone displays the home screen or displays the screen of the another application, if the mobile phone receives an instruction of instructing to enter the telephoto assist mode through voice by the user, the mobile phone starts the camera and enters the telephoto assist mode. For another example, when the mobile phone is in a screen-on state and displays the home screen, or when the mobile phone is in the screen-off state shown in FIG. 4C, if the mobile phone detects an operation of drawing a preset track 2 (for example, a "CF" track) on the touchscreen by the user, the mobile phone starts the camera and enters the telephoto assist mode.

The foregoing described manner of entering the telephoto assist mode is merely an example for description. The mobile phone may alternatively enter the telephoto assist mode in another manner. A specific manner is not limited in this embodiment of this application.

Figure 5A:
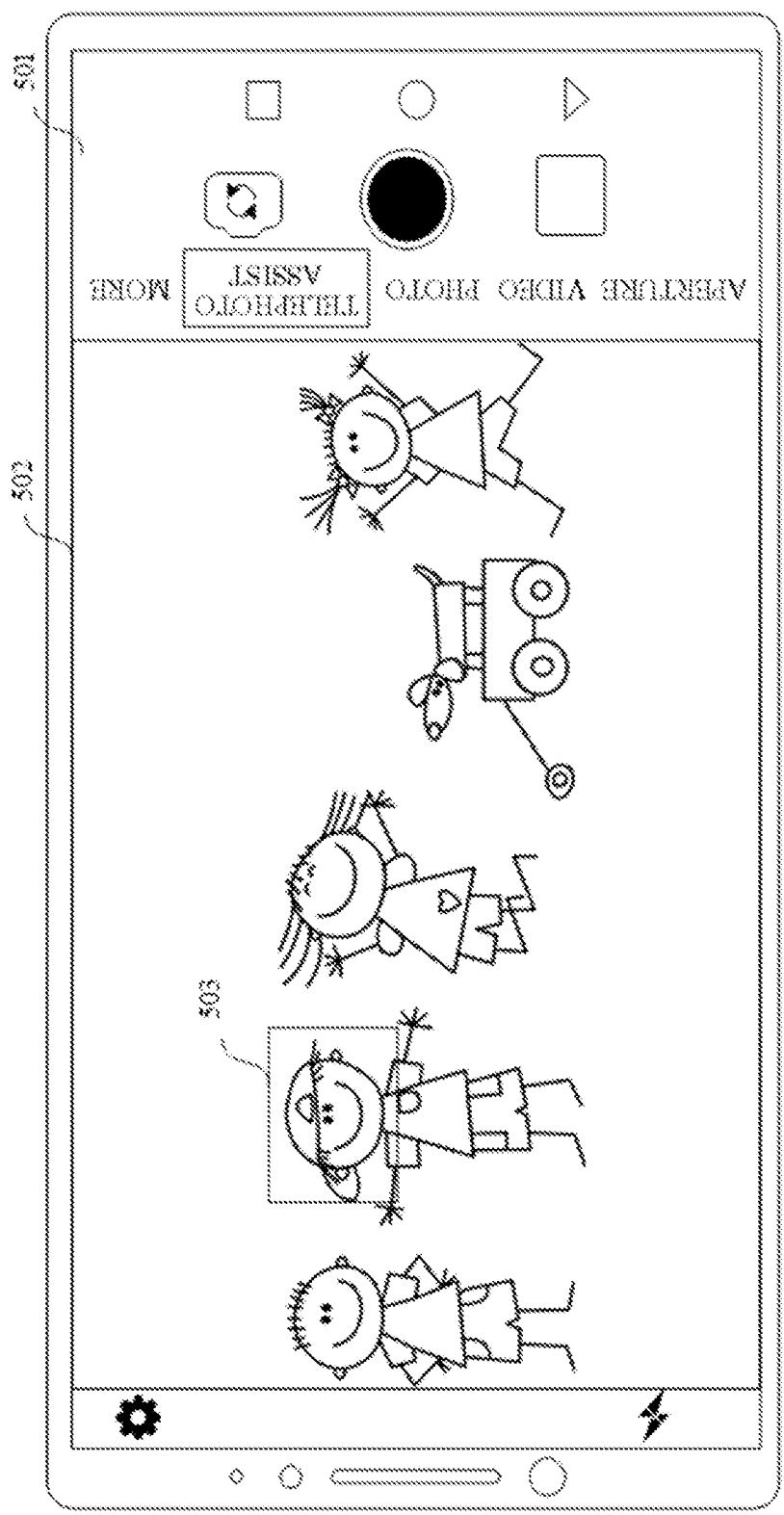
FIG. 5A to FIG. 5G are schematic diagrams of a group of telephoto assist preview screens according to an embodiment of this application.
Figure 5B:
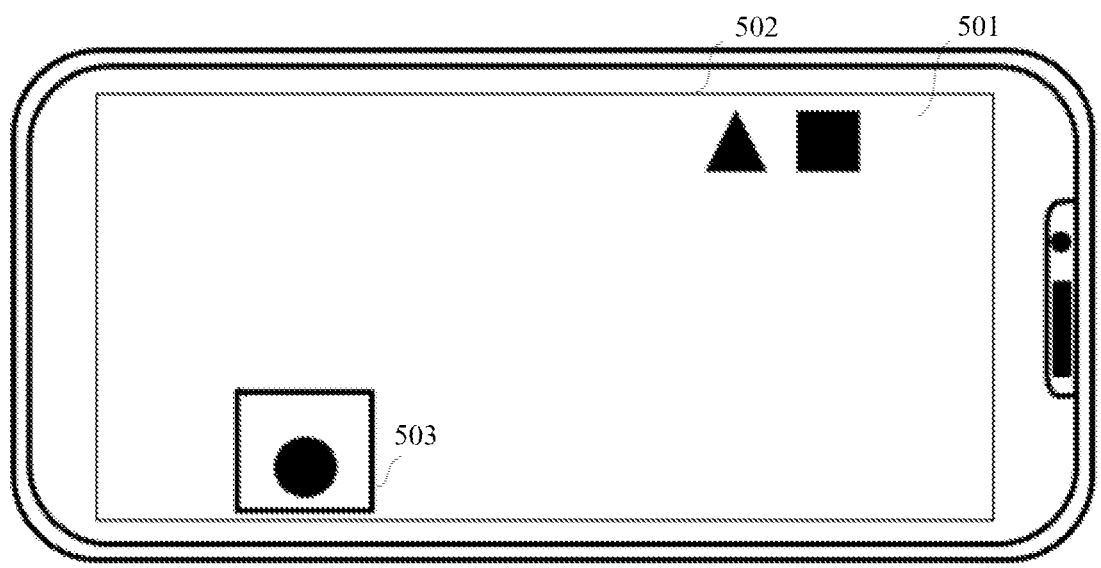
Figure 5C:
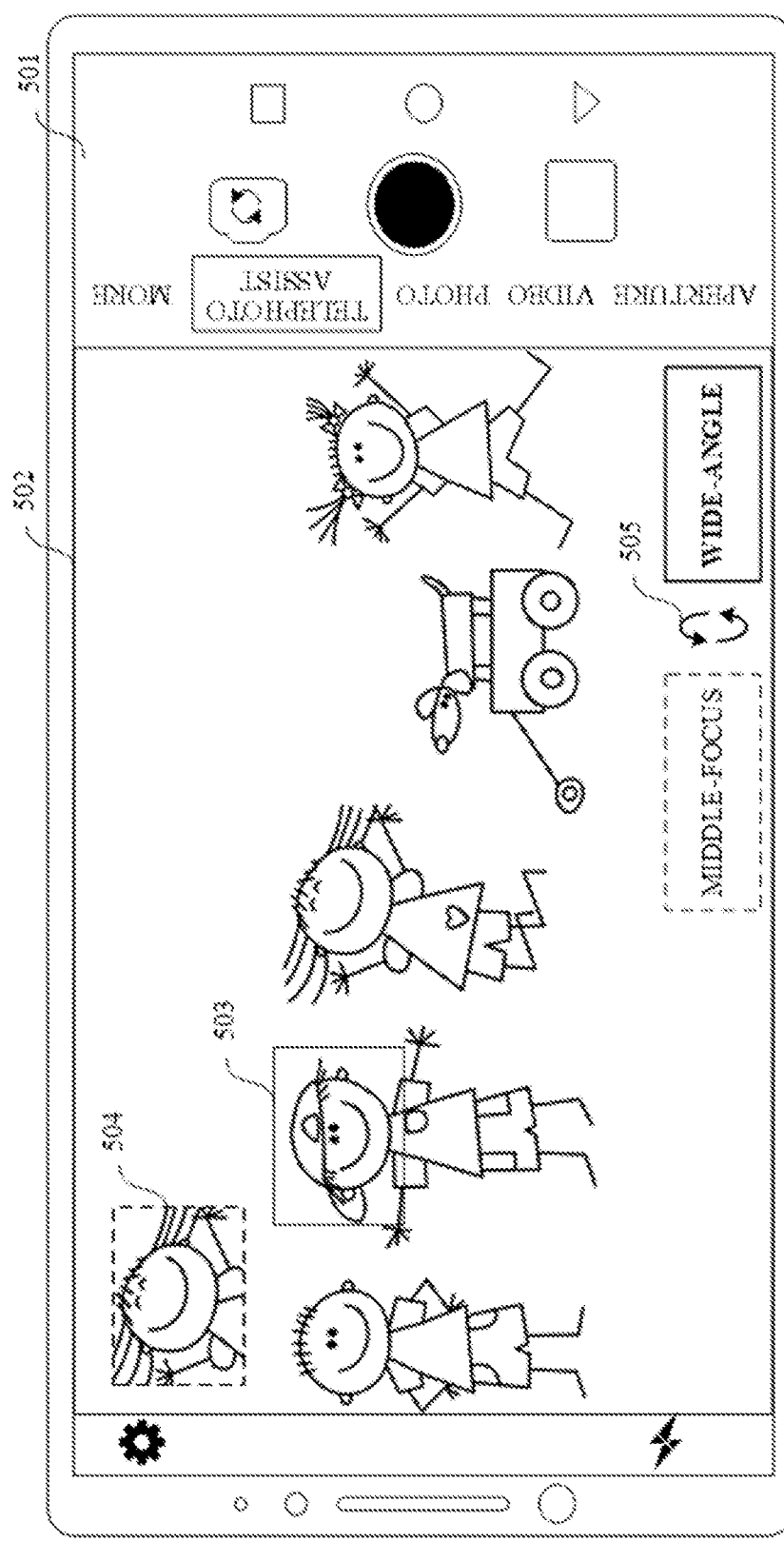
Figure 5D:
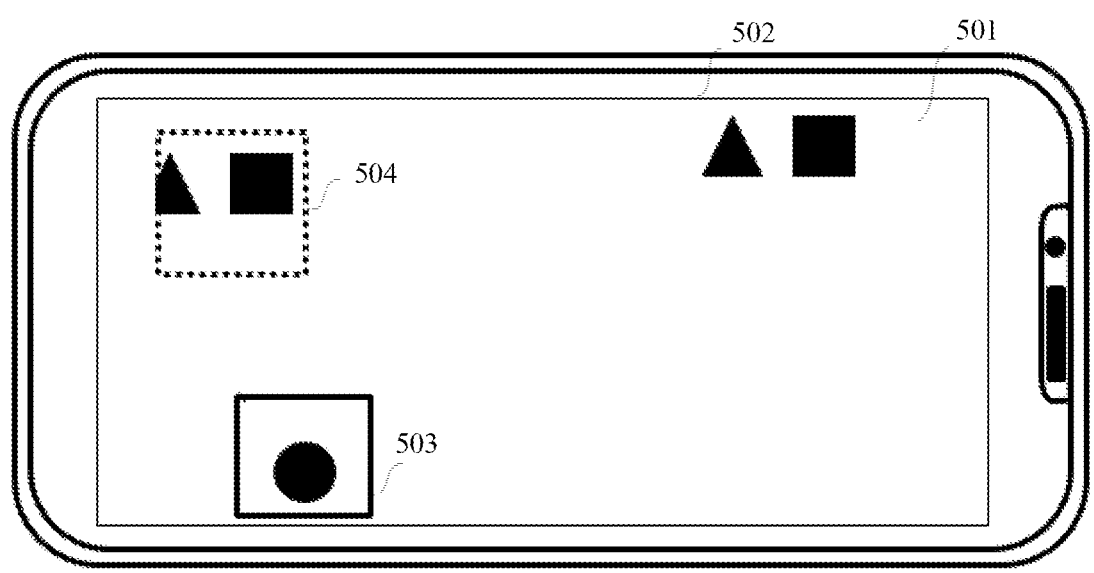

After entering the telephoto assist mode, the mobile phone starts an assist camera lens and the long-focus camera lens. The mobile phone may display a telephoto assist preview screen. As shown in FIG. 5A or FIG. 5B, a telephoto assist preview screen 501 may include an assist viewfinder frame 502 and a target viewfinder frame 503. In some embodiments, as shown in FIG. 5C or FIG. 5D, the telephoto assist preview screen 501 may further include a real-time viewfinder frame 504.

The assist viewfinder frame 502 may be used to display a preview picture collected by the assist camera lens, and the preview picture is also referred to as an assist preview picture. The assist camera lens may be a default camera lens, or may be a camera lens specified by the user. The assist camera lens may be a wide-angle camera lens, a middle-focus camera lens, or the like whose framing range is greater than a framing range of a long-focus camera lens. In some embodiments, the assist viewfinder frame 502 may cover an entire display region, that is, the mobile phone may display the assist preview picture in full screen.

For example, the assist camera lens is a wide-angle camera lens. The assist viewfinder frame 502 shown in FIG. 5C displays the assist preview picture collected by the wide-angle camera lens. After the mobile phone detects an operation of tapping a control 505 by the user, the mobile phone may switch from the assist camera lens to a middle-focus camera lens, and the assist viewfinder frame 502 displays the assist preview picture collected by the middle-focus camera lens.

A zoom ratio of the assist preview picture in the assist viewfinder frame 502 may correspondingly change according to an instruction of the user. For example, referring to FIG. 5E, after the mobile phone detects an operation of dragging a zoom scale 506 by the user, the mobile phone may adjust the zoom ratio of the assist preview picture in the assist viewfinder frame 502.

The target viewfinder frame 503 may be used to display a target object that is to be shot by the long-focus camera lens and that is specified in the assist preview picture by the user. In other words, content in the target viewfinder frame 503 is the target object specified by the user. In some embodiments, prompt information may be displayed near the target viewfinder frame 503, or the mobile phone may play voice information to prompt the user that the viewfinder frame is used to select the target object by using a frame.

A picture in the target viewfinder frame 503 is a part selected from the assist preview picture. A size of the picture displayed in the target viewfinder frame 503 matches a size of the picture in the assist preview picture. After the user specifies the target object, when the assist preview picture in the assist viewfinder frame 502 changes, the target viewfinder frame 503 moves with a location change of the target object in the assist preview picture. When the zoom ratio of the picture in the assist viewfinder frame 502 changes, the size of the picture displayed in the assist viewfinder frame 502 also correspondingly changes, and the size of the picture displayed in the target viewfinder frame 503 also correspondingly changes.

Figure 5E:
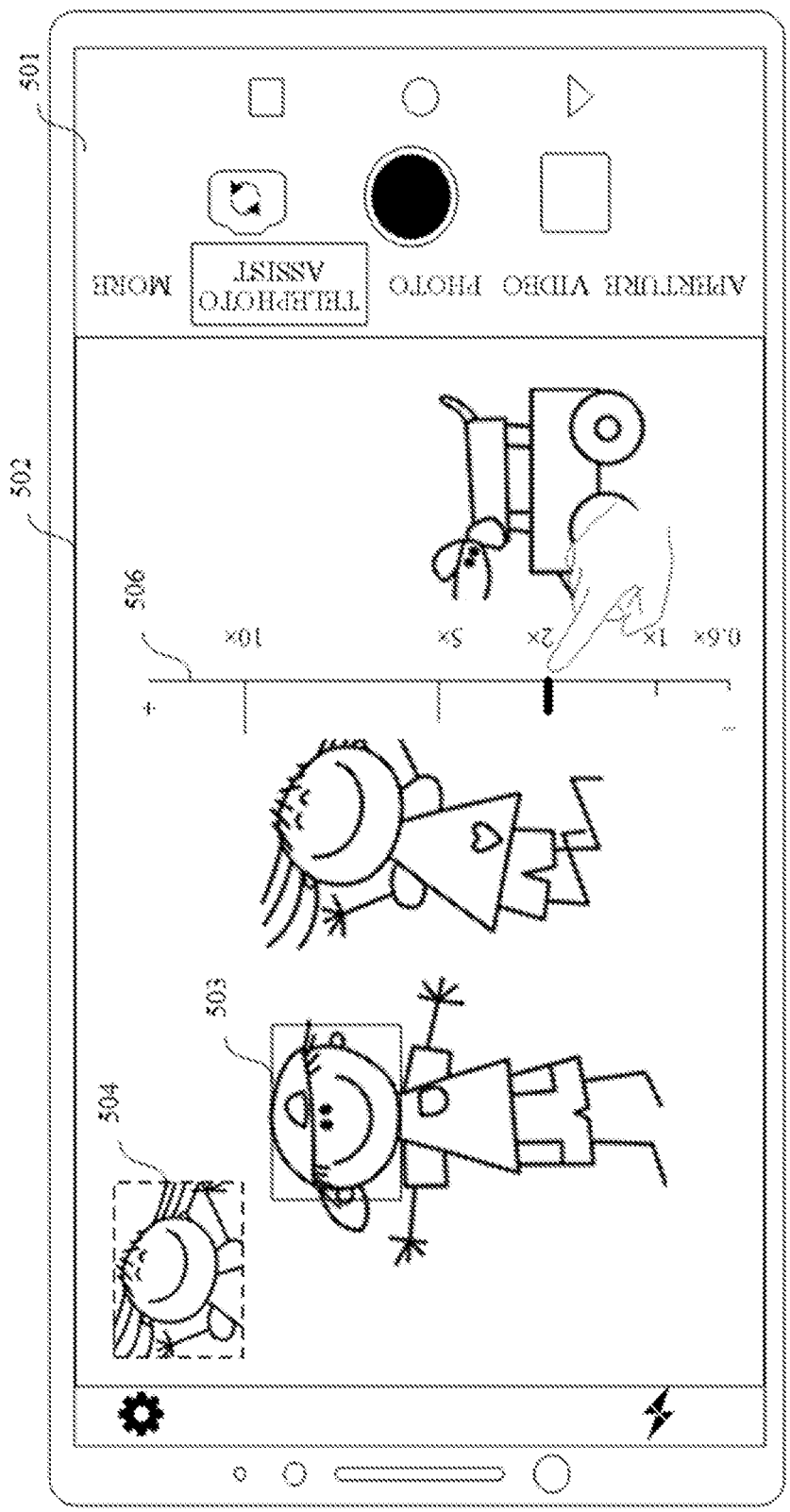

For example, in comparison with FIG. 5C, a zoom ratio of an assist preview picture corresponding to FIG. 5E is relatively large, and a size of a picture of the target object in the target viewfinder frame 503 is also relatively large.

In some embodiments, after entering the telephoto assist preview mode, the target viewfinder frame 503 may be located by default in a central region of the assist preview picture; or located by default at a location specified by the user last time; or select a person, a building, or another object in the assist preview picture by default by using a frame. The user may drag the target viewfinder frame 503, so that the target object to be shot by the long-focus camera lens is located in the target viewfinder frame 503 to select the target object to be shot by the long-focus camera lens. In addition, the user may further change a location of the target viewfinder frame 503 and change the content in the target viewfinder frame 503 by dragging the target viewfinder frame 503, to change the target object to be shot by the long-focus camera lens.

In some other embodiments, after entering the telephoto assist preview mode, the target viewfinder frame 503 is at a default location. The content in the target viewfinder frame 503 may not be a target object that the user wants to shoot by using the long-focus camera lens. The user has not specified the target object. After the mobile phone detects an operation of dragging the target viewfinder frame 503 by the user, the mobile phone determines that the user specifies the target object, and the content in the target viewfinder frame 503 is the target object specified by the user.

In a process of moving the target viewfinder frame 503, the real-time viewfinder frame 504 may further automatically move, to keep away from the target viewfinder frame 503. In this way, overlapping between the real-time viewfinder frame 504 and the target viewfinder frame 503 is avoided, which is convenient for the user to intuitively and clearly see content in the real-time viewfinder frame 504 and the content in the target viewfinder frame 503.

Figure 5F:
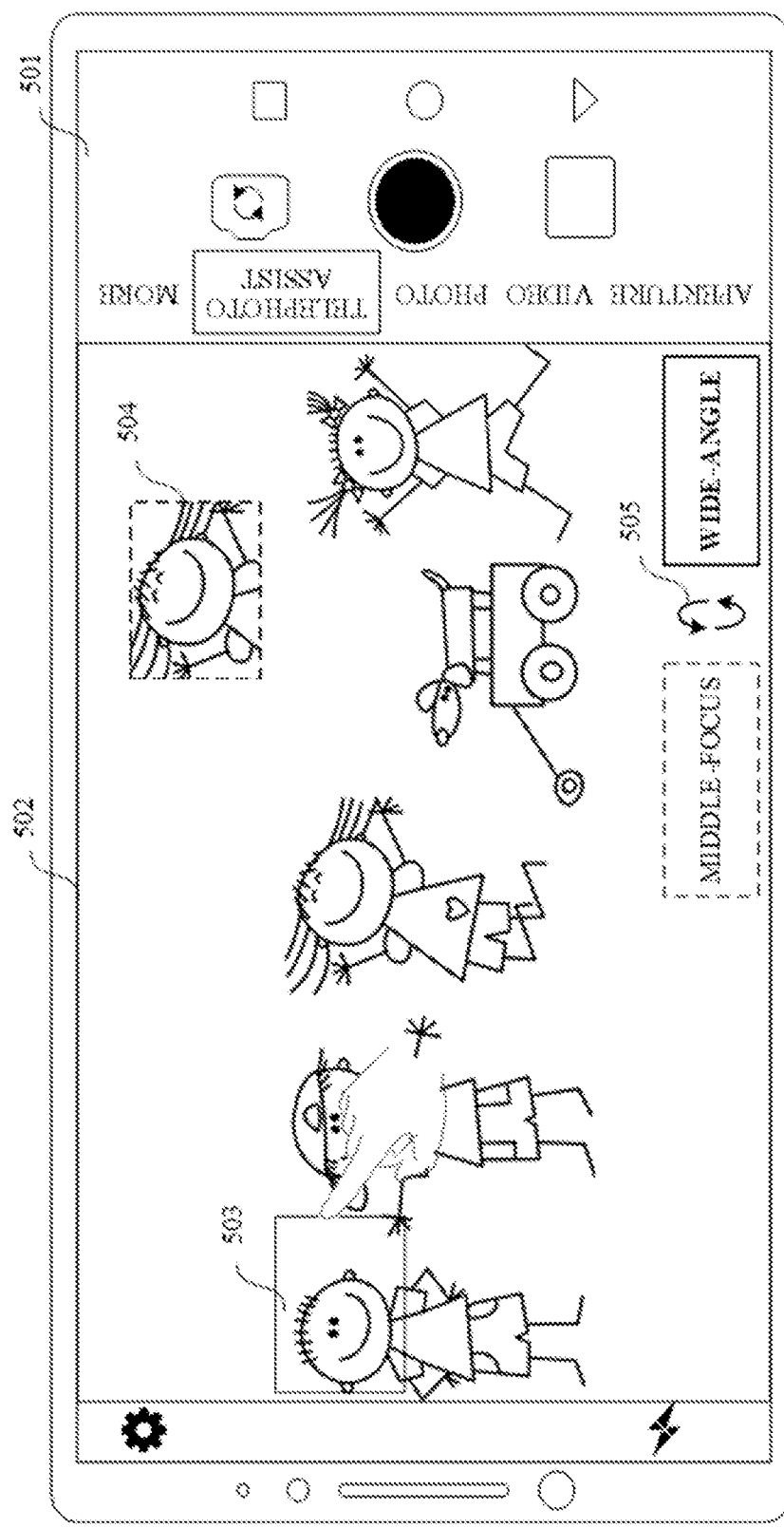

For example, in a case shown in FIG. 5C, after the user drags the target viewfinder frame 503, the telephoto assist preview screen displayed by the mobile phone may be shown in FIG. 5F.

In some embodiments, the size of the target viewfinder frame 503 is fixed. In some other embodiments, the size of the target viewfinder frame 503 may change. The zoom ratio of the picture displayed in the real-time viewfinder frame 504 may be negatively correlated with the size of the target viewfinder frame 503. In other words, the larger target viewfinder frame 503 indicates the smaller zoom ratio of the picture in the real-time viewfinder frame 504, and the smaller target viewfinder frame 503 indicates the larger zoom ratio of the picture in the real-time viewfinder frame 504. The user may adjust the zoom ratio of the picture in the viewfinder frame 504 in real time by adjusting the size of the target viewfinder frame 503.

Because the preview picture collected by the long-focus camera lens in real time is displayed in the real-time viewfinder frame 504, in some embodiments, the zoom ratio of the preview picture collected by the long-focus camera lens in real time may also be negatively correlated with the size of the target viewfinder frame 503.

Figure 5G:
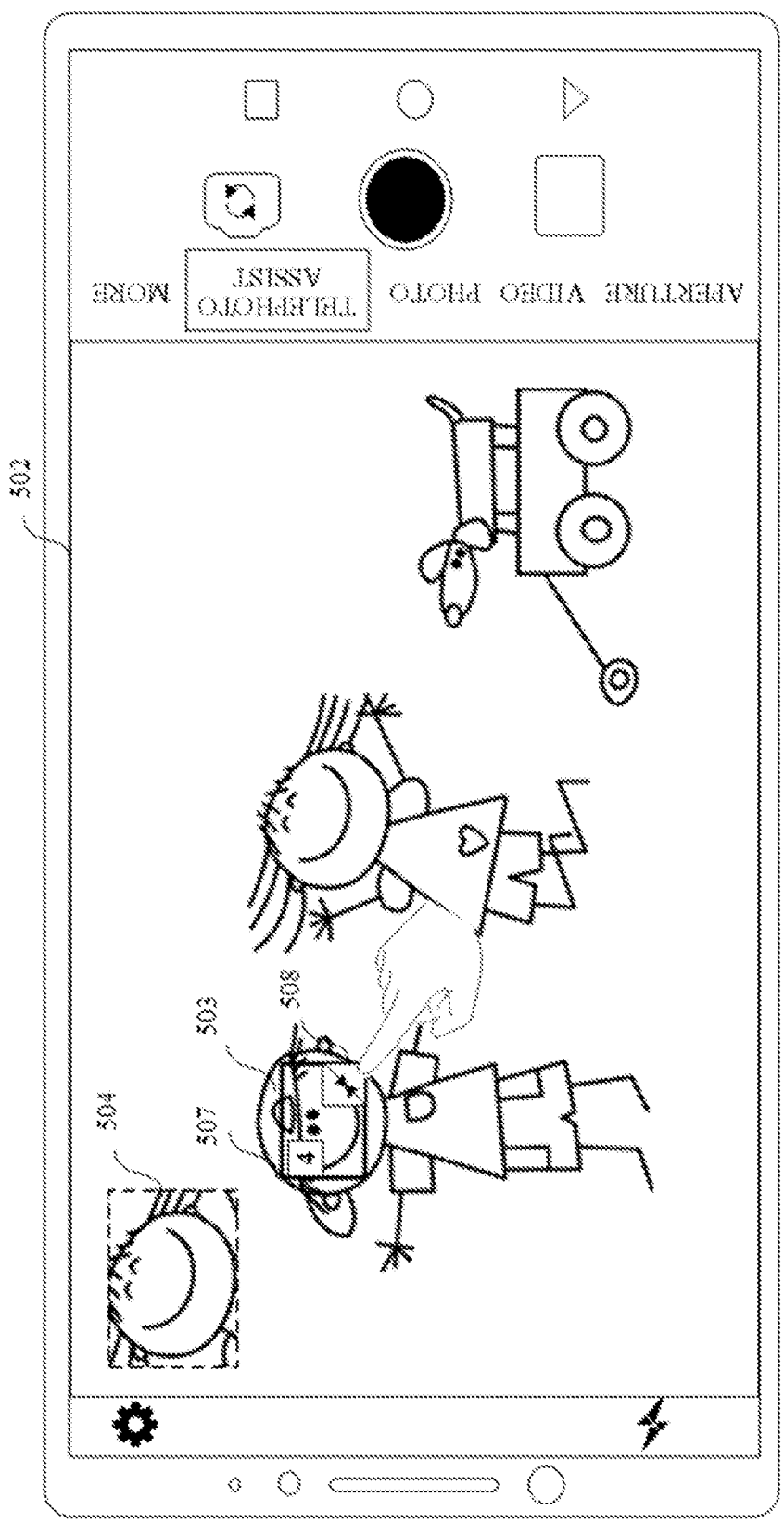

For example, referring to FIG. 5G, a digital mark 507 and a zoom mark 508 are displayed in the target viewfinder frame 503. When the user touches and holds the zoom mark 508 and drags a border line of the target viewfinder frame 503, the size of the target viewfinder frame 503 correspondingly changes. A number in the digital mark 507 corresponds to the size of the changed target viewfinder frame 503. When the user does not touch and hold the zoom mark 508 but directly drags the border line of the target viewfinder frame 503, the location of the target viewfinder frame 503 changes, and the size of the target viewfinder frame 503 does not change.

For another example, the zoom mark 508 is displayed in the target viewfinder frame 503. When the user drags the border line of the target viewfinder frame 503 for a first time after tapping the target viewfinder frame, the size of the target viewfinder frame 503 correspondingly changes. When the user drags the border line of the target viewfinder frame 503 for an $n^{th}$ (n is an integer greater than 1) time after tapping the target viewfinder frame, or when the user directly drags the border line of the target viewfinder frame 503 without tapping the zoom mark 508, the location of the target viewfinder frame 503 changes, and the size of the target viewfinder frame 503 does not change.

When the zoom ratio of the picture in the real-time viewfinder frame 504 changes, the size of the target viewfinder frame 503 also correspondingly changes. For example, when the user changes the number in the digital mark 507 shown in FIG. 5G, or when the user performs a pinch operation or an operation opposite to the pinch operation in the real-time viewfinder frame 504, the zoom ratio of the picture in the real-time viewfinder frame 504 changes, and the size of the target viewfinder frame 503 also correspondingly changes.

The preview picture collected in real time by the long-focus camera lens may be displayed in the real-time viewfinder frame 504. In some embodiments, prompt information may be displayed near the real-time viewfinder frame 504, or the mobile phone may play voice information to indicate to the user that the picture displayed in the viewfinder frame is the picture collected by the long-focus camera lens.

In some embodiments, the size of the picture displayed in the real-time viewfinder frame 504 may correspond to a default zoom ratio (for example, 5) of the long-focus camera lens. In some other embodiments, the zoom ratio of the picture displayed in the real-time viewfinder frame 504 may correspond to the size of the target viewfinder frame 503. When the size of the target viewfinder frame 503 changes, the zoom ratio of the picture displayed in the real-time viewfinder frame 504 also correspondingly changes. For example, in comparison with FIG. 5C, the zoom ratio of the picture displayed in the real-time viewfinder frame 504 in FIG. 5E is increased to 4, and the size of the preview picture displayed in the real-time viewfinder frame 504 is relatively large and matches the zoom ratio: 4. In some embodiments, the size of the picture displayed in the real-time viewfinder frame 504 may correspond to a current zoom ratio of the assist preview picture.

In some embodiments, the size of the real-time viewfinder frame 504 is fixed. In some other embodiments, the user may change the size of the real-time viewfinder frame 504.

In some embodiments, a size ratio of the real-time viewfinder frame 504 (that is, a ratio of two adjacent sides of the real-time viewfinder frame 504) and a size ratio of the target viewfinder frame 503 (that is, a ratio of two adjacent sides of the target viewfinder frame 503) may match a picture output ratio of a photosensitive sensor of the long-focus camera lens (that is, a ratio of a picture formed in a width direction and a height direction by using the photosensitive sensor). In this way, a framing range of the real-time viewfinder frame 504 and that of the target viewfinder frame 503 may be maximized as much as possible.

In the telephoto assist preview screen, the user may use the assist viewfinder frame 502, the target viewfinder frame 503, and the real-time viewfinder frame 504 to intuitively browse and compare in real time the preview picture collected by the assist camera lens, the target object, and the preview picture collected by the long-focus camera lens.

In some embodiments, the mobile phone may determine a real-time current motion posture by using a sensor such as a gyroscope or an acceleration sensor. The motion posture may include information such as a tilt angle and a location of the mobile phone. The mobile phone calculates, based on the target object specified in the target viewfinder frame 503, a corresponding target motion posture of the mobile phone when the long-focus camera lens locks (or can shoot) the target object, that is, when the target object falls within the framing range of the long-focus camera lens. Then, the mobile phone may calculate, based on the real-time current motion posture and the target motion posture, adjustment information such as an offset distance, an offset direction, and a deflection angle from the real-time current motion posture to the target motion posture of the mobile phone. The mobile phone may prompt the user based on the adjustment information, to guide the user to move (including pan, flip, and the like) the mobile phone to the target motion posture. Therefore, the target object is placed in the framing range of the long-focus camera lens, and the long-focus camera lens can lock the target object to take a picture.

For example, the real-time current motion posture is the motion posture shown in FIG. 1C, and the target object is a to-be-shot object 1. For example, the to-be-shot object 1 may be the target object in the target viewfinder frame 503 in FIG. 5C.

As shown in FIG. 1C, the to-be-shot object 1 is not in the framing range of the long-focus camera lens. It can be learned from a correspondence to the telephoto assist preview screen shown in FIG. 5C that the preview picture collected in the real-time viewfinder frame 504 does not include the target object.

Figure 1D:
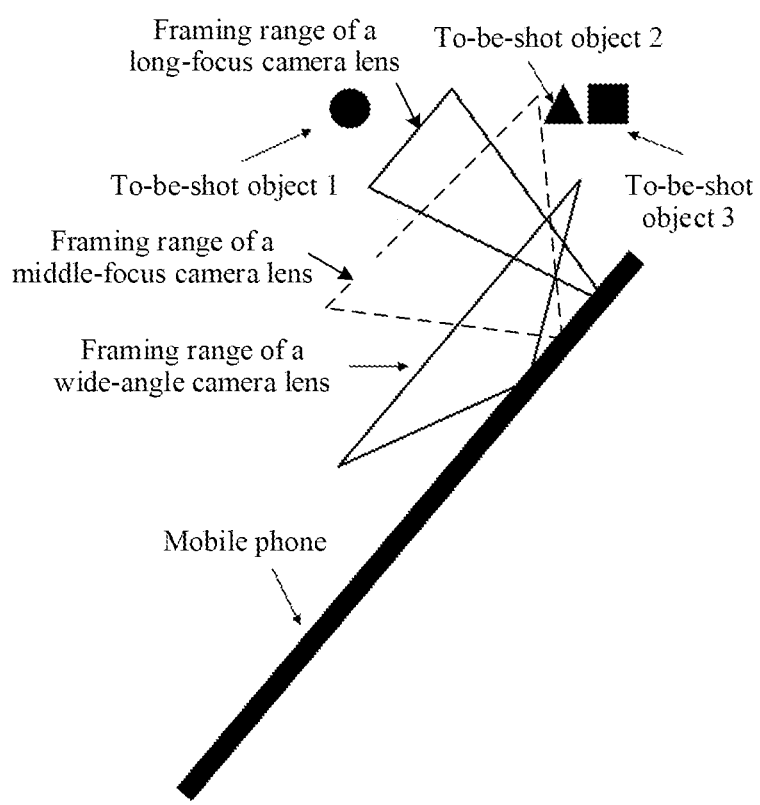
FIG. 1D is a schematic diagram of framing ranges of another group of different camera lenses according to an embodiment of this application.

In order that the long-focus camera lens can shoot the to-be-shot object 1, as shown in FIG. 1D, the to-be-shot object 1 needs to be placed in the framing range of the long-focus camera lens. In this way, the preview picture collected by the long-focus camera lens can include the to-be-shot object 1. In other words, the mobile phone needs to be in the target motion posture shown in FIG. 1D, so that the to-be-shot object 1 can be placed in the framing range of the long-focus camera lens, and the long-focus camera lens can lock the to-be-shot object 1.

In some technical solutions, based on the real-time current motion posture of the mobile phone and a relative relationship between a location of the target object in the assist preview picture and a location (the location may be referred to as a reference location) that is of the content of the preview picture currently collected by the long-focus camera lens and that is in the assist preview picture, the mobile phone may determine the corresponding target motion posture of the mobile phone when the target object is moved to the reference location, that is, when the long-focus camera lens can shoot the target object.

In some other technical solutions, the mobile phone may determine a relative relationship between a first location, in actual space, of the content of the preview picture collected by the long-focus camera lens in the real-time viewfinder frame and a second location, in actual space, of the target object in the target viewfinder frame. Therefore, when the long-focus camera lens locks the target object at the second location, the corresponding target motion posture of the mobile phone is determined based on the relative relationship and the real-time current motion posture of the mobile phone.

Figure 6:
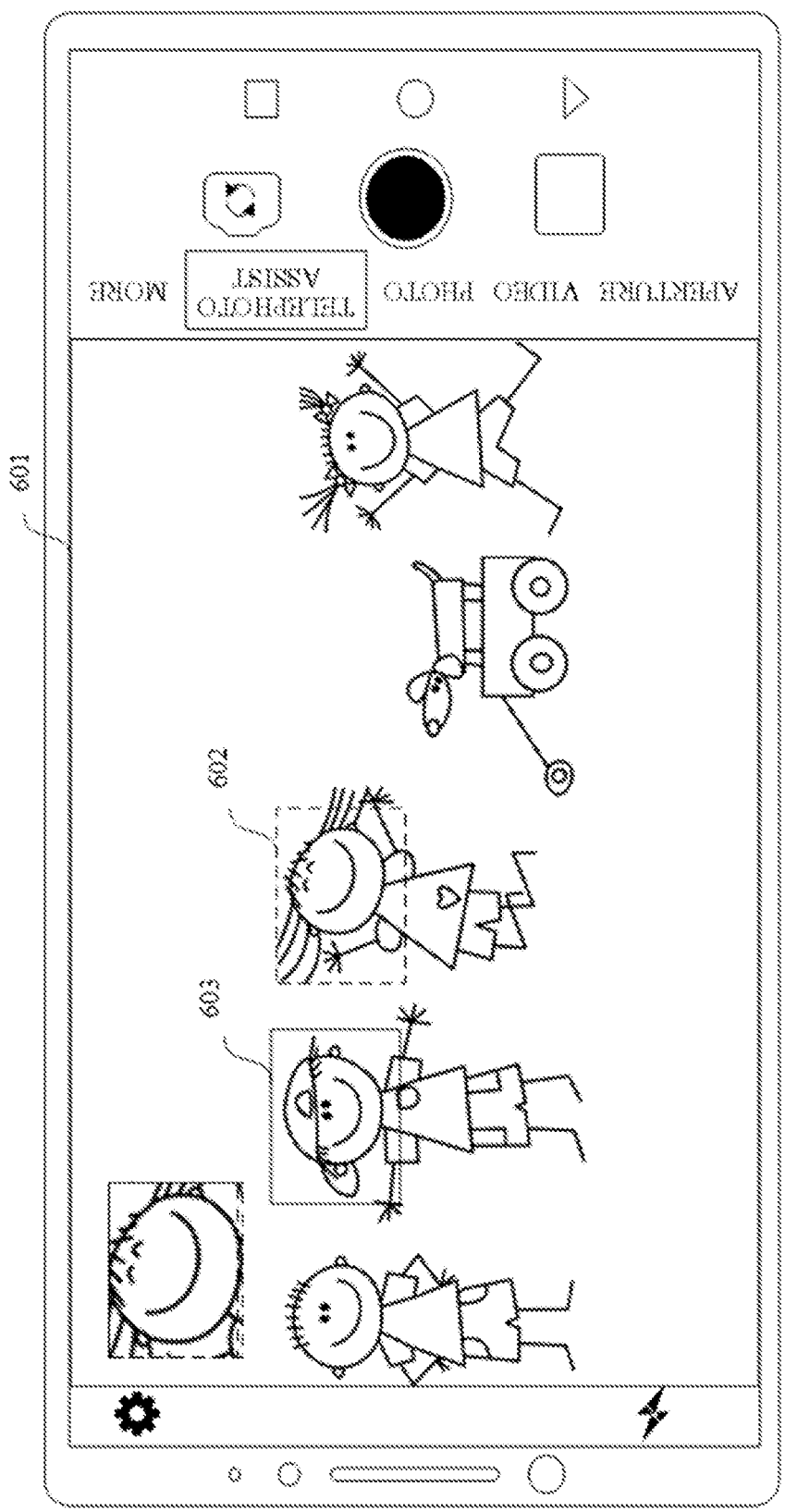
FIG. 6 is a schematic diagram of a correspondence between different camera lenses and different regions according to an embodiment of the present invention.

In some other technical solutions, because different camera lenses have different framing ranges, preview pictures collected by the different camera lenses may correspond to different region ranges of display regions. For example, as shown in FIG. 6, the framing range of the assist camera lens may correspond to an entire assist viewfinder frame 601.

The framing range of the long-focus camera lens may correspond to a region 602. In this way, the content that is of the preview picture collected by the long-focus camera lens and that is displayed in the real-time viewfinder frame 504 is located in the region 602 in an assist preview picture. When a target object in a target viewfinder frame 603 is not in the framing range of the long-focus camera lens, a target object in the assist preview picture is outside the region 602. When the target object in the target viewfinder frame 603 is in the framing range of the long-focus camera lens, the target object in the assist preview picture is in the region 602. Based on the real-time current motion posture and a relative location between the target object in the current assist preview picture and the region 602, the mobile phone may determine a corresponding target motion posture of the mobile phone when the target object is located in the region 602.

In some embodiments, the framing range of the long-focus camera lens may overlap a central region of the framing range of the assist camera lens. In this way, the region 602 may be a central region of a display region. In other words, the region 602 may be a central region of the assist viewfinder frame 601.

Therefore, the mobile phone may determine adjustment information based on the difference between the real-time current motion posture and the target motion posture, and prompt the user to move the mobile phone based on the adjustment information. The mobile phone may prompt the user by using a plurality of methods based on the adjustment information.

Figure 7A:
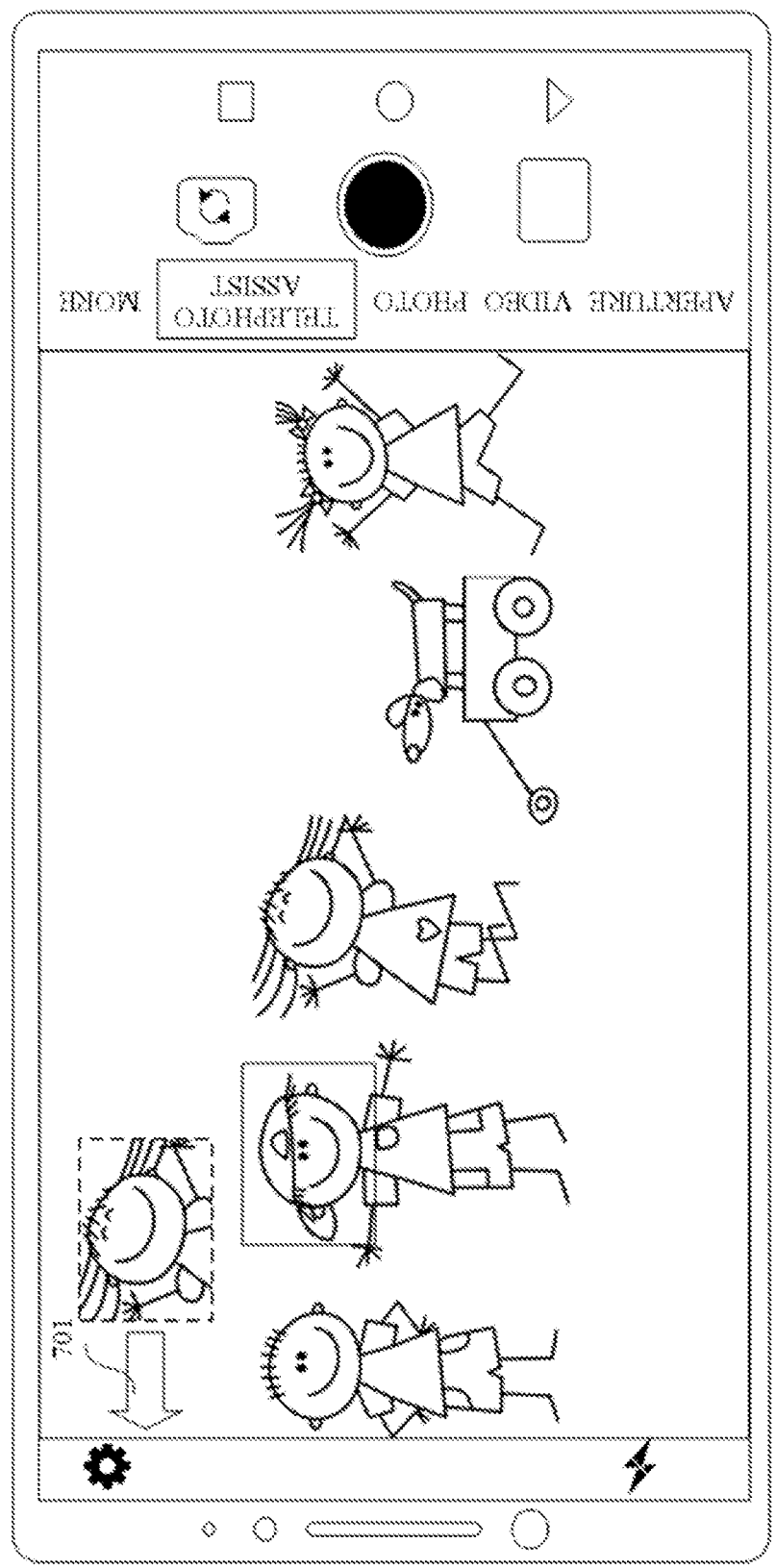
FIG. 7A to FIG. 7D are schematic diagrams of a group of prompt identifiers according to an embodiment of this application.
Figure 7B:
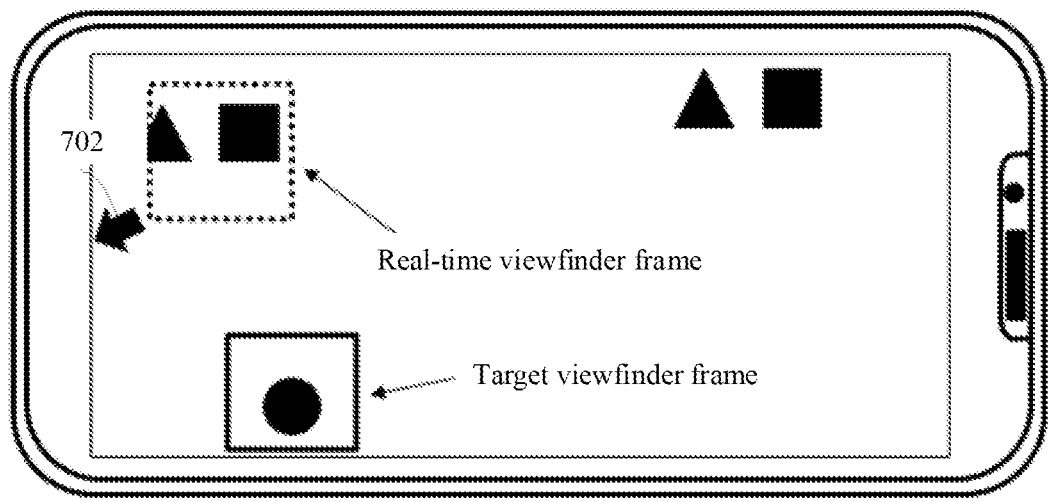
Figure 7C:
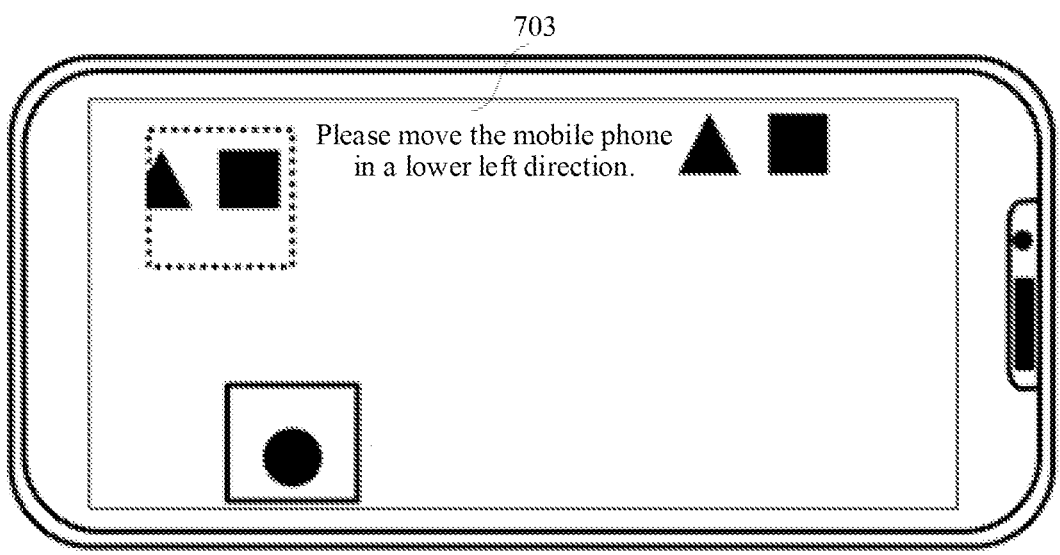

For example, in some embodiments, the mobile phone may display a prompt identifier to guide the user to move the mobile phone. For example, the prompt identifier may be used to indicate a direction of guiding the user to move the mobile phone. For example, the prompt identifier is used to guide the user to move the mobile phone upward, downward, leftward, rightward, in an upper left direction, in a lower right direction, or the like. For example, referring to FIG. 7A, the prompt identifier is an arrow 701. A direction indicated by using the arrow 701 is a direction of guiding the user to move the mobile phone. The arrow 701 is used to guide the user to move the mobile phone leftward. For another example, referring to FIG. 7B, the prompt identifier is an arrow 702, and the arrow 702 is used to guide the user to move the mobile phone in a lower left direction. For another example, referring to FIG. 7C, the prompt identifier is text information 703. The text information 703 is used to prompt the user to "move the mobile phone in a lower left direction".

It should be noted that the prompt information may provide guidance of a general direction for the user, to avoid a long-time searching process caused by the user in blindly searching for the target object around. In this way, a time for locking the target object by the long-focus camera lens is reduced, and user experience is improved.

It should be noted that, in an actual shooting process, the user usually flips the mobile phone unconsciously in a process of moving the mobile phone based on the prompt identifier. The user performs subjective determining based on a relative location, in the assist viewfinder frame, between the content in the real-time viewfinder frame and the content in the target viewfinder frame, or based on a location of the target object in actual three-dimensional space, to actively flip the mobile phone in the process of moving the mobile phone, so that the long-focus camera lens can lock the target object more quickly.

In some other embodiments, the prompt identifier may be further used to indicate an amplitude of guiding the user to move the mobile phone, so that the user learns of a value of a moving distance, thereby providing more accurate guidance for the user. Therefore, the user and the long-focus camera lens can lock the target object more quickly, and a time of searching for the target object by the user is reduced.

For example, the prompt identifier is an arrow, and a size of the arrow is used to indicate a distance for guiding the user to move the mobile phone. When the user moves the mobile phone in a correct direction, the arrow becomes smaller (or shorter). When the user moves the mobile phone in an incorrect direction, the arrow becomes larger (or longer). For another example, the prompt identifier is text information, and the text information may be "Please move 2 cm in a 30° lower left direction".

In some other embodiments, the prompt identifier may be further used to indicate whether the user flips the mobile phone at a correct angle, thereby providing more accurate guidance for the user. Therefore, the user and the long-focus camera lens can lock the target object more quickly. If the direction in which the user moves the mobile phone is correct, and the direction in which the user flips the mobile phone is also correct, the arrow becomes smaller (or shorter). If the direction in which the user moves the mobile phone is correct, but the direction in which the user flips the mobile phone is incorrect, the arrow does not become smaller (or shorter). The arrow becomes smaller (or shorter) only after the user adjusts a direction of flipping the mobile phone.

In some other embodiments, the mobile phone may continuously guide the user by using voice. For example, the mobile phone may instruct, by using voice, the user to "move in an upper right direction", "move downward", or the like.

Figure 7D:
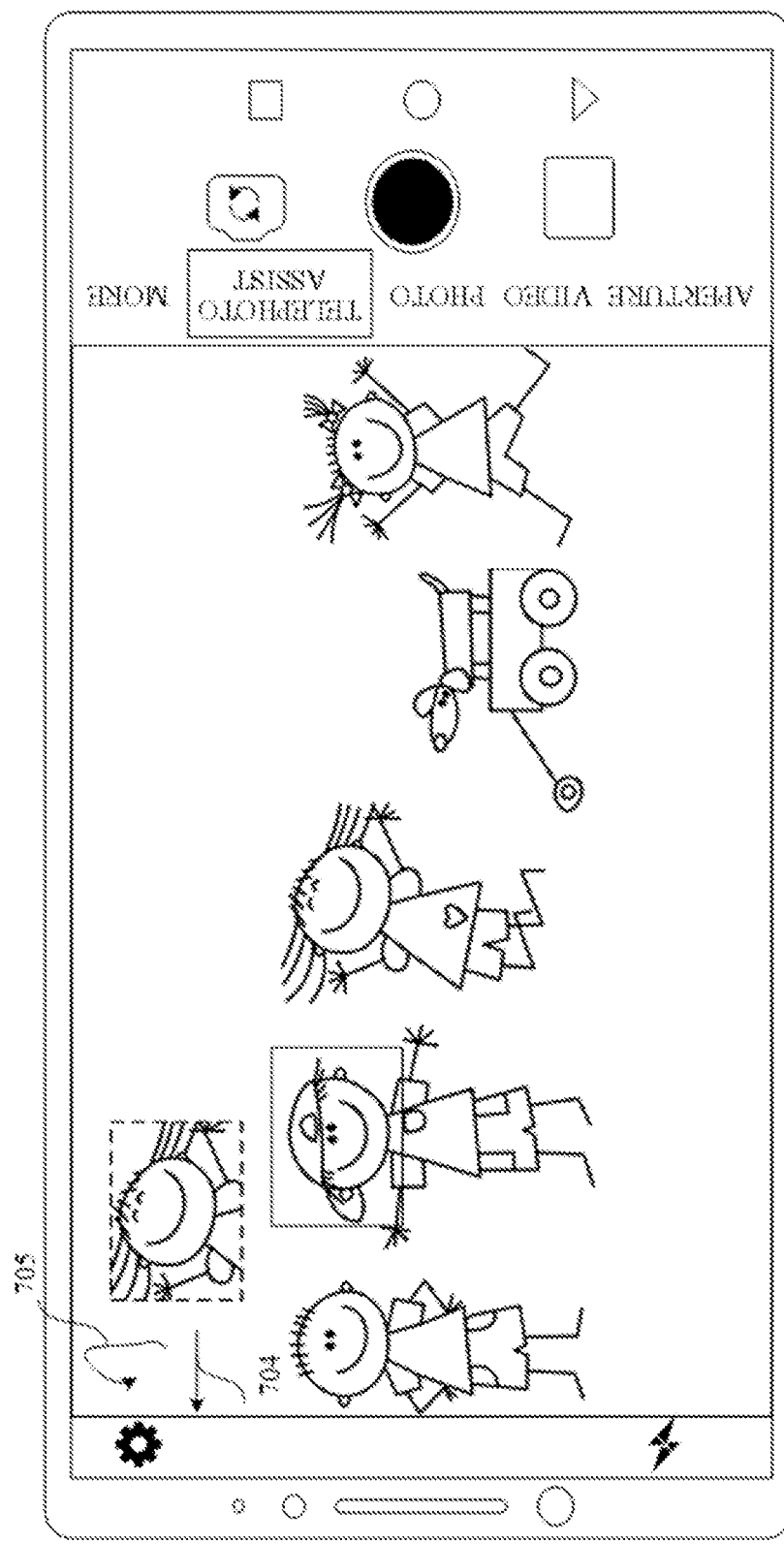

In some other embodiments, the prompt identifier may be further used to indicate a motion posture of adjusting the mobile phone by the user in three-dimensional space, thereby providing more accurate guidance for the user. Therefore, the user and the long-focus camera lens can lock the target object more quickly, and a time of searching for the target object by the user is reduced. For example, prompt content may include a moving direction and a flipping direction of the mobile phone. For example, referring to FIG. 7D, the prompt identifier includes an arrow 704 and an arrow 705. The arrow 704 is used to prompt the user to move the mobile phone leftward. The arrow 705 is used to prompt the user to flip the mobile phone to the front of a touchscreen (that is, a side with a display function). For another example, the prompt identifier is voice prompt information "Please move the mobile phone leftward and flip the mobile phone to the front of the touchscreen by about 20°".

If the user changes the target object by dragging the target viewfinder frame, the mobile phone may further determine adjustment information based on the modified target object, and prompt the user based on the adjustment information, to guide the user to move the mobile phone.

In a process in which the user guides the mobile phone based on the prompt information, the target object is increasingly close to the framing range of the long-focus camera lens. The preview picture that is collected by the long-focus camera lens in real time and that is displayed in the real-time viewfinder frame is increasingly similar to the picture of the target object in the target viewfinder frame.

After being moved, the mobile phone may determine whether the target object is in the framing range of the long-focus camera lens, that is, whether the long-focus camera lens locks the target object. For example, when the mobile phone determines that the real-time current motion posture matches the target motion posture, the target object is basically in the framing range of the long-focus camera lens, that is, the mobile phone determines that the long-focus camera lens basically locks the target object. For example, when determining that similarity between the real-time current motion posture and the target motion posture is greater than a preset value 4 (for example, 90%), the mobile phone may determine that the real-time current motion posture matches the target motion posture.

The mobile phone may switch to displaying the long-focus preview interface after determining that the long-focus camera lens locks the target object.

It should be noted that a method in which the mobile phone determines that the long-focus camera lens locks the target object may be further implemented in a plurality of other manners. For example, when the mobile phone determines, by using a picture recognition technology, that the picture in the real-time viewfinder frame 504 matches the content of the picture in the target viewfinder frame 503, the mobile phone determines that the long-focus camera lens basically locks the target object, and then switches to the long-focus preview screen. For example, the mobile phone may calculate similarity between the picture in the real-time viewfinder frame 504 and the picture in the target viewfinder frame 503. If the similarity is greater than or equal to a preset value 5 (for example, 80%), the mobile phone may determine that the long-focus camera lens basically locks the target object.

For example, an algorithm for performing picture matching based on picture recognition may include a grayscale-based template matching algorithm, a feature-based matching algorithm, an optical flow method, and the like. For example, the grayscale-based template matching algorithm may include a mean absolute differences algorithm (sum of absolute differences, MAD), a sum of absolute differences algorithm (sum of squared differences, SAD), a mean square differences algorithm (mean square differences, MSD), a sequential similarity detection algorithm (sequential similarity detection algorithm, SSDA), and the like.

Generally, complex calculation such as convolution needs to be performed to determine similarity between pictures by using the picture recognition technology, which consumes a relatively large amount of computing resources and has a relatively low calculation speed. In comparison with the picture recognition, calculating the similarity between the real-time motion posture and the target motion posture based on data collected by a sensor such as a gyroscope is relatively simple, which requires a relatively small calculation amount and has a relatively high calculation speed.

After the mobile phone switches to the long-focus preview screen, the preview picture collected by the long-focus camera lens may be displayed on the long-focus preview screen in full screen. The assist preview picture and the target viewfinder frame are not displayed on the long-focus preview screen any more.

A size ratio of the picture on the long-focus preview screen may be consistent or inconsistent with a size ratio of the picture in the real-time viewfinder frame. The target viewfinder frame and the real-time viewfinder frame are not displayed on the long-focus preview screen any more.

In a case, after switching to a scenario preview interface, a zoom ratio of the preview picture on the long-focus preview screen is a default zoom ratio. The user may change a value of the default zoom ratio at a setting screen. In another case, after switching to the long-focus preview screen, a zoom ratio of the preview picture on the long-focus preview screen is consistent with the zoom ratio corresponding to the size of the target viewfinder frame before the switching.

Figure 8A:
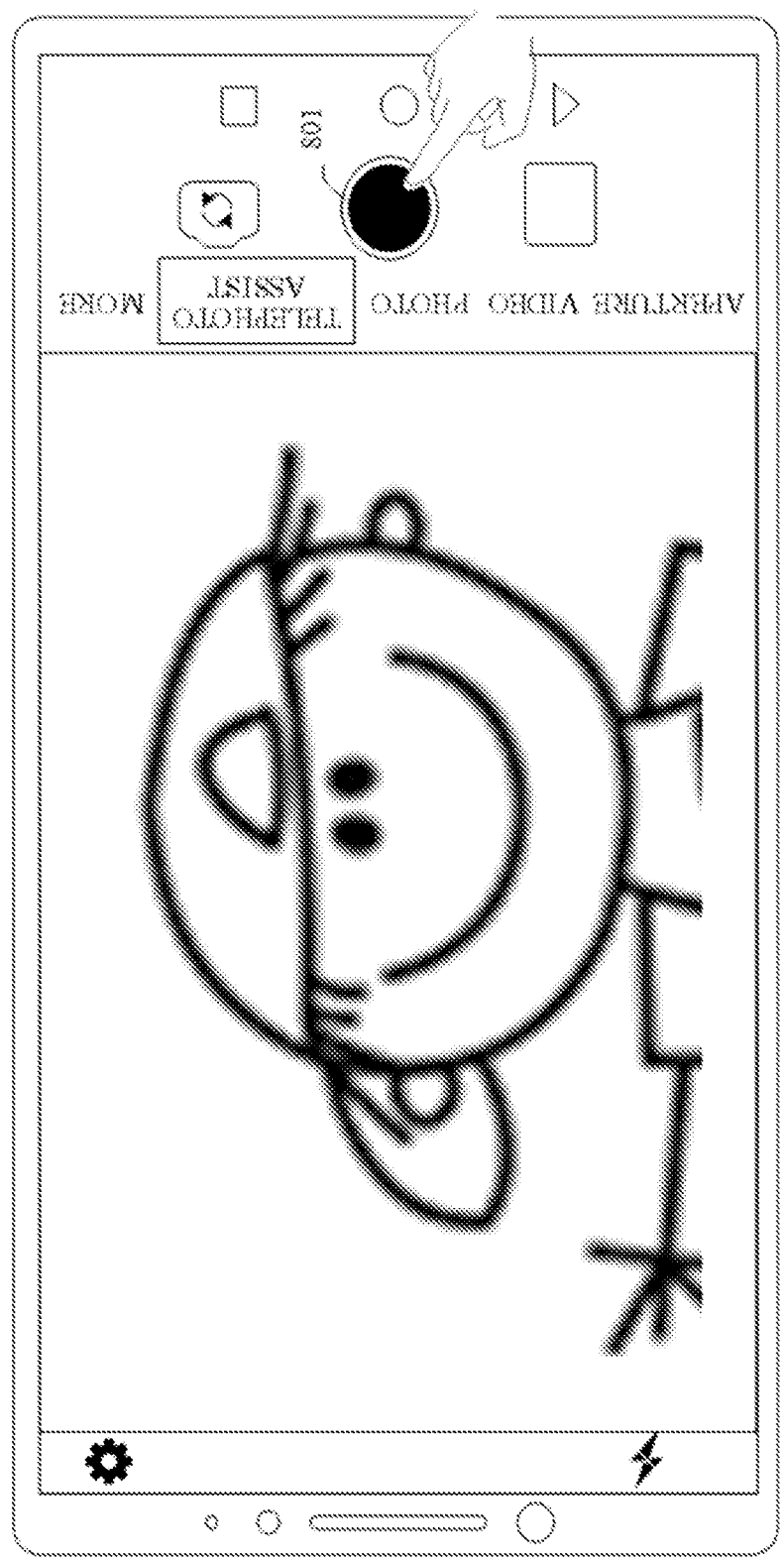
FIG. 8A to FIG. 8C are schematic diagrams of a group of telephoto preview screens according to an embodiment of this application.

In some embodiments, the long-focus preview screen includes a shooting control. For example, referring to FIG. 8A, the mobile phone takes a picture after detecting an operation of tapping a shooting control 801 on the long-focus preview screen by the user.

Figure 8B:
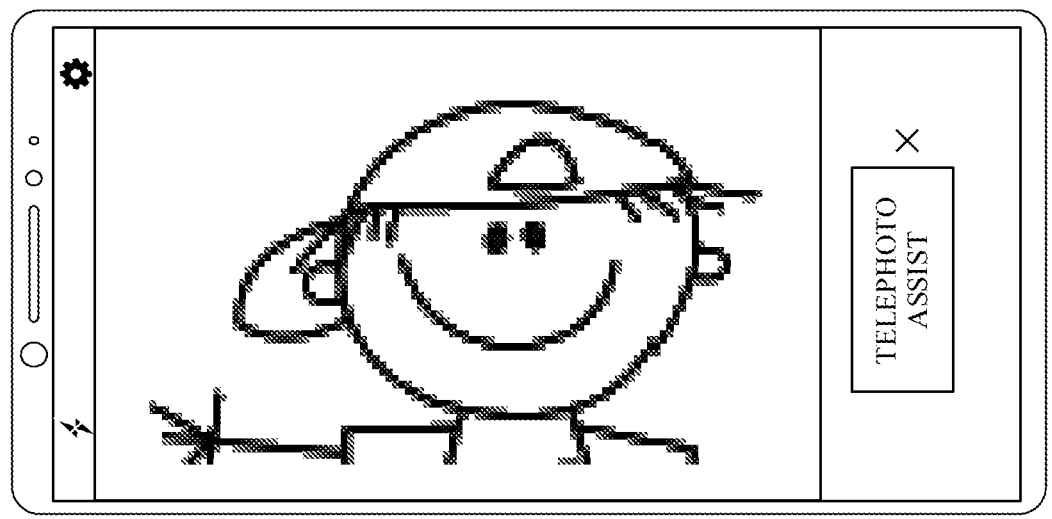
Figure 8C:
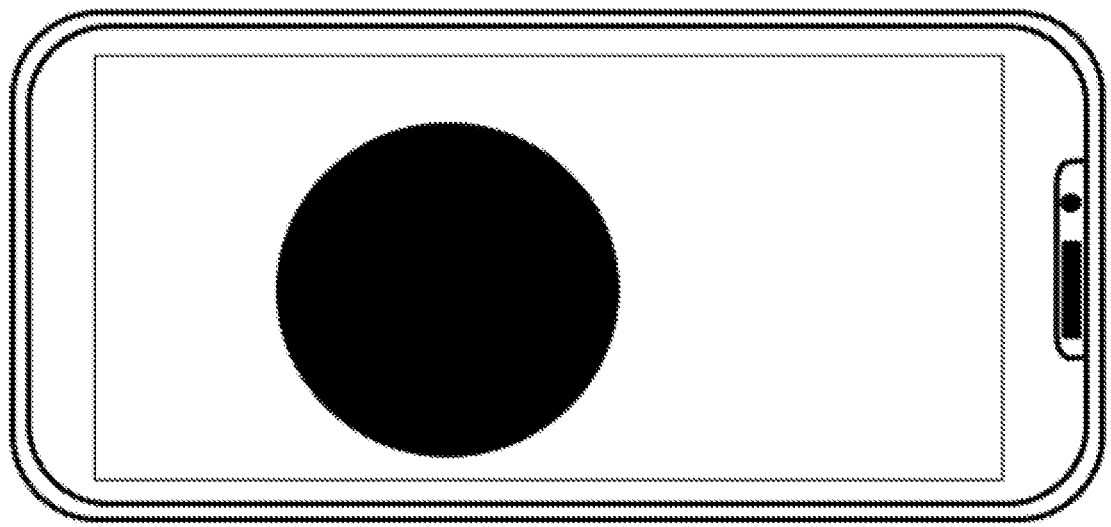

In some other embodiments, for the long-focus preview screen, refer to FIG. 8B or FIG. 8C. After the mobile phone switches to displaying the long-focus preview screen, the mobile phone automatically takes one or more pictures, so that an operation of instructing shooting by the user can be reduced.

Figure 9A:
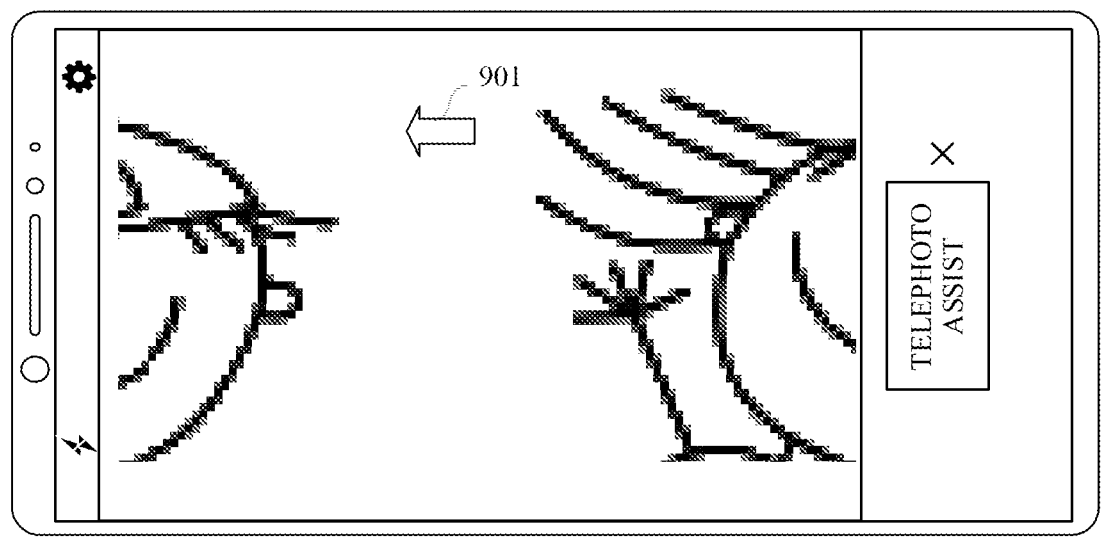
FIG. 9A to FIG. 9B are schematic diagrams of another group of prompt identifiers according to an embodiment of this application.
Figure 9B:
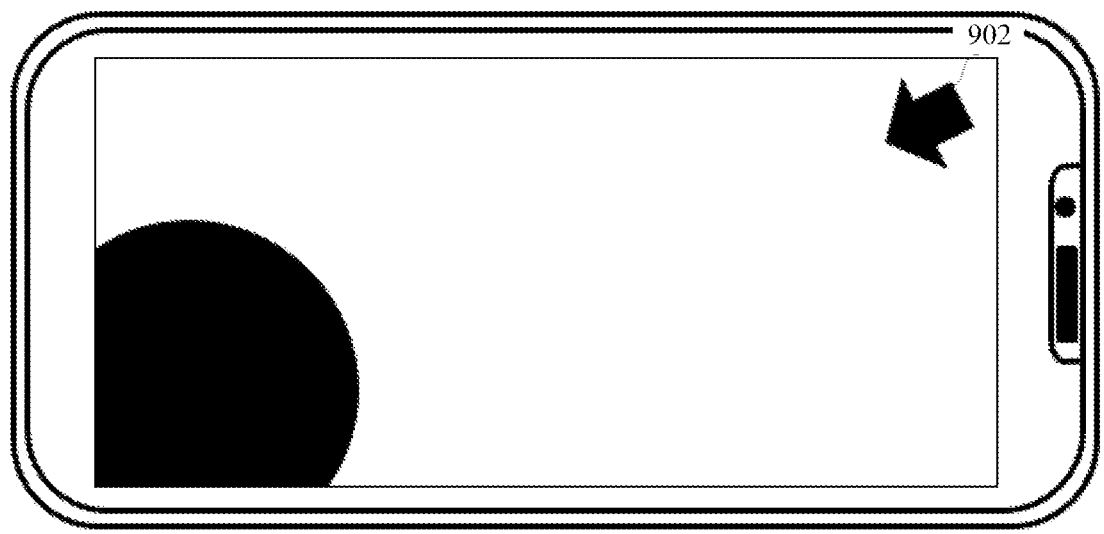

Due to hand jitter or another reason, after switching to displaying the long-focus preview screen, the target object may deviate from a screen center or cannot appear on the long-focus preview screen (that is, the target object is lost). Consequently, the long-focus camera lens cannot lock the target object. For example, the long-focus preview screen may be shown in FIG. 9A or FIG. 9B.

Therefore, in some other embodiments, after switching to displaying the long-focus preview screen, the mobile phone may continue to determine the real-time current motion posture. If the real-time current motion posture does not match the target motion posture, or if the preview picture collected by the long-focus camera lens in real time does not match the picture in the target viewfinder frame, the manner described in the foregoing embodiment is continuously used to prompt the user to move the mobile phone, so that the long-focus camera lens can lock the target object again. For example, the prompt identifier used to prompt the user to move the mobile phone may be an arrow 901 in FIG. 9A, or an arrow 902 in FIG. 9B.

After switching to displaying the long-focus preview screen, if the real-time current motion posture matches the target motion posture, or if the preview picture collected by the long-focus camera lens in real time matches the picture in the target viewfinder frame, or if the user moves the mobile phone under the guidance of the mobile phone so that the real-time current motion posture matches the target motion posture or the preview picture collected by the long-focus camera lens in real time matches the picture in the target viewfinder frame, in a technical solution, the mobile phone automatically takes a picture. In another technical solution, the mobile phone may stop prompting the user and take a picture after detecting the operation of instructing shooting by the user. In another technical solution, the mobile phone may prompt, in a manner such as prompt information, voice, and vibration, the user that the target object is locked, and take a picture after detecting the operation of instructing shooting by the user.

Because the automatic shooting is automatically performed when the real-time current motion posture matches the target motion posture or when the picture in the real-time viewfinder frame 504 matches the picture in the target viewfinder frame 503, the shot object is a target object specified by the user, thereby reducing an operation of the user and improving shooting efficiency and user experience.

After the mobile phone takes a picture, if the long-focus camera lens does not lock the target object any more because the target object deviates (that is, the target object is not at a center of the shot picture) or is lost (that is, the target object is not shot, and the target object does not appear in the shot picture), the mobile phone may further continue to guide the user in the manner described in the foregoing embodiment, so that the long-focus camera lens can lock the target object again. Particularly, after the mobile phone automatically takes a picture, the automatically shot picture may not achieve an ideal effect. The user may further continue to move the mobile phone under the guidance of the mobile phone, to manually take one or more pictures with a better effect after the target object is locked again.

In some embodiments, after switching to displaying the long-focus preview screen, if the user wants to change the target object, the mobile phone may first exit from the telephoto assist mode. For example, after the mobile phone detects an operation of tapping "x" in FIG. 8B by the user, the mobile phone may exit from the telephoto assist mode. After the mobile phone enters the telephoto assist mode again, the user specifies a new target object again by using the target viewfinder frame.

In some other embodiments, after switching to displaying the long-focus preview screen, if the user wants to change the target object, the mobile phone may exit from the long-focus preview screen, and return to display the foregoing telephoto assist preview screen including the target viewfinder frame, to specify a new target object again by using the target viewfinder frame. For example, when the mobile phone displays the long-focus preview screen, after the mobile phone detects an operation of tapping a back (back) key by the user, the mobile phone may return to display the telephoto assist preview screen including the target viewfinder frame.

In some other scenarios, the target object is in a moving state. For example, the target object is continuously moving. For another example, after the telephoto assist preview screen is displayed, the target object suddenly starts to move. For another example, after switching to displaying the telephoto assist preview screen, the target object suddenly starts to move.

When the target object is in the moving state, the user and the long-focus camera lens are prone to lose the target object. In some embodiments, the mobile phone may track the target object in the moving state in real time. The target viewfinder frame on the telephoto assist preview screen may move in real time as the target object moves. In addition, the mobile phone may calculate a real-time target motion posture corresponding to the target object in the moving state. The mobile phone may calculate real-time adjustment information based on a difference between the real-time current motion posture and the real-time target motion posture, adjust the prompt information for the user in real time based on the real-time adjustment information, and prompt the user to move the mobile phone.

The following is similar to the process described in the foregoing embodiment. When the mobile phone displays the long-focus preview screen, and the real-time current motion posture matches the real-time target motion posture or the content of the picture in the real-time viewfinder frame 504 matches the content of the picture in the target viewfinder frame 503, the mobile phone determines that the long-focus camera lens basically locks the target object, and switches to displaying the long-focus preview screen.

After switching to displaying the long-focus preview screen, the mobile phone may automatically take a picture, which is similar to the process described in the foregoing embodiment.

Alternatively, after switching to displaying the long-focus preview screen, the mobile phone may continue to collect the assist preview picture in background and track the target object in real time, which is similar to the process described in the foregoing embodiment. If the real-time current motion posture matches the real-time target motion posture, or if the preview picture currently collected by the long-focus camera lens matches the picture of the target object tracked in real time, the mobile phone may be triggered to automatically take a picture, thereby assisting the user in shooting the dynamic target object by using a long-focus camera lens.

It should be noted that, when the target object is in the moving state, the mobile phone automatically takes a picture, so that the target object can be shot in time. In this way, the following case is avoided: The shot target object goes out of the framing range of the long-focus camera lens before the user taps a shooting control in time to shoot the target object.

Figure 10A:
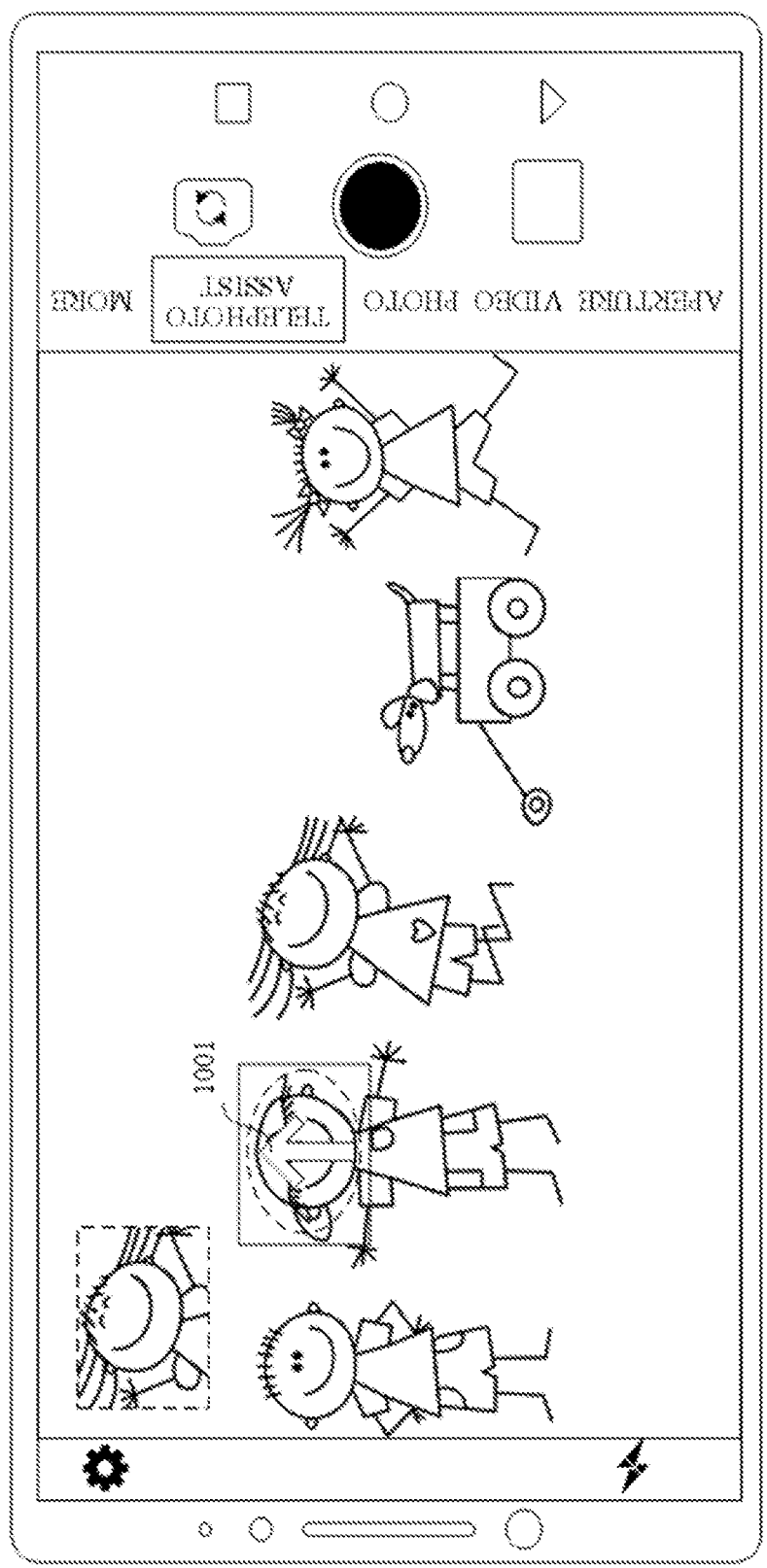
FIG. 10A to FIG. 10B are schematic diagrams of a group of motion marks according to an embodiment of this application.
Figure 10B:
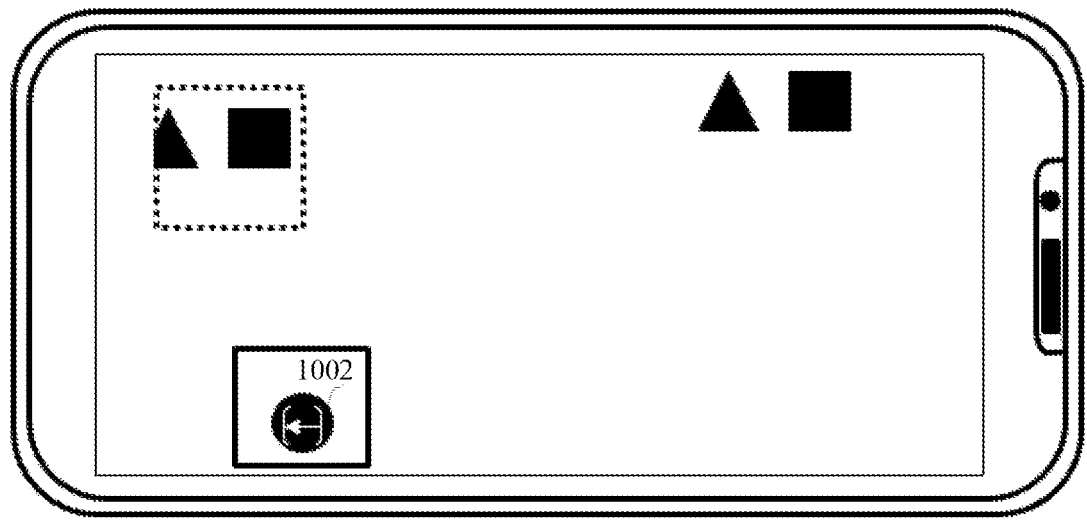

In addition, when the target object is in the moving state, the mobile phone may further display a motion mark on the telephoto assist preview screen. For example, the motion mark is used to indicate a moving direction of the target object and a contour of the target object. The motion mark may facilitate the user to intuitively learn of information such as a size, a location, and a moving direction of the target object. For example, FIG. 10A is a schematic diagram of a motion mark 1001. An elliptical dashed line in the motion mark 1001 is used to mark a contour and a size of a moving target object. An arrow in the motion mark 1001 is used to mark a moving direction of the target object. For another example, FIG. 10B is a schematic diagram of a motion mark 1002. Herein, "[ ]" in the motion mark 1002 is used to mark a contour and a size of a moving target object. An arrow in the motion mark 1002 is used to mark a moving direction of the target object.

The foregoing is mainly described by using an example in which the mobile phone guides the user to perform photographing by using the long-focus camera lens. The user may also specify the target object in a video recording process. The mobile phone may also use the method described in the foregoing embodiment to give a prompt to the user, to guide the user to move the mobile phone when the long-focus camera lens is used for video recording. This helps the user lock the target object as much as possible by using the long-focus camera lens. In this way, the mobile phone performs tracking and video recording on the target object.

Figure 11A:
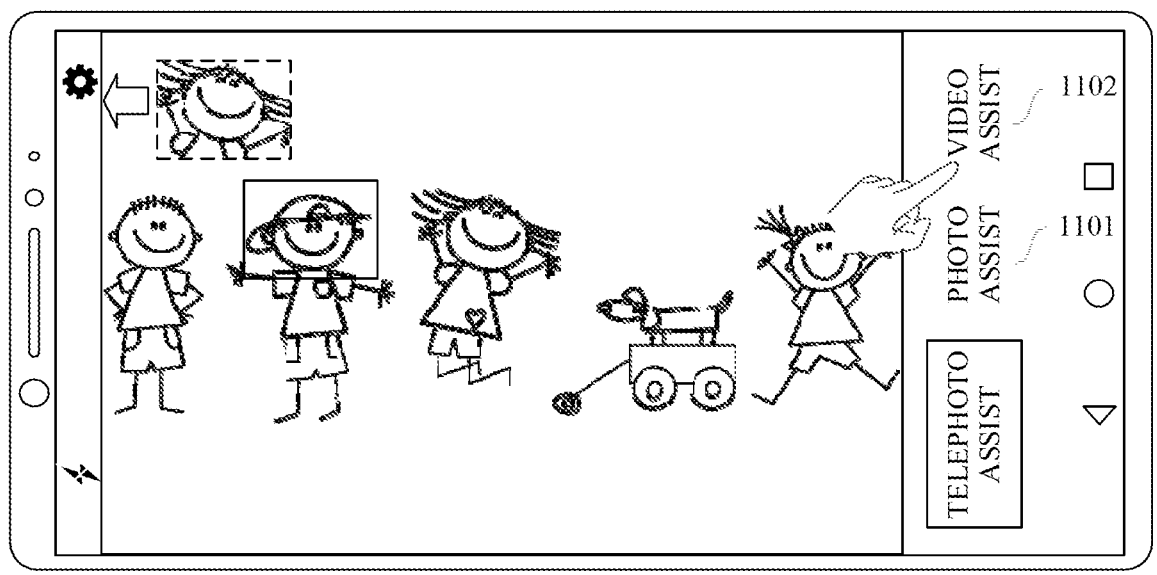
FIG. 11A to FIG. 11C are schematic diagrams of a group of telephoto assist video recording screens according to an embodiment of this application.

For example, referring to FIG. 11A, after the mobile phone enters the telephoto assist mode, the telephoto assist preview screen may include a first control 1101 and a second control 1102. After the mobile phone detects an operation of tapping the first control 1101 by the user, the mobile phone enters a telephoto assist photographing sub-mode. The mobile phone may guide the user to move the mobile phone, so that the long-focus camera lens locks the target object and takes a picture.

Figure 11B:
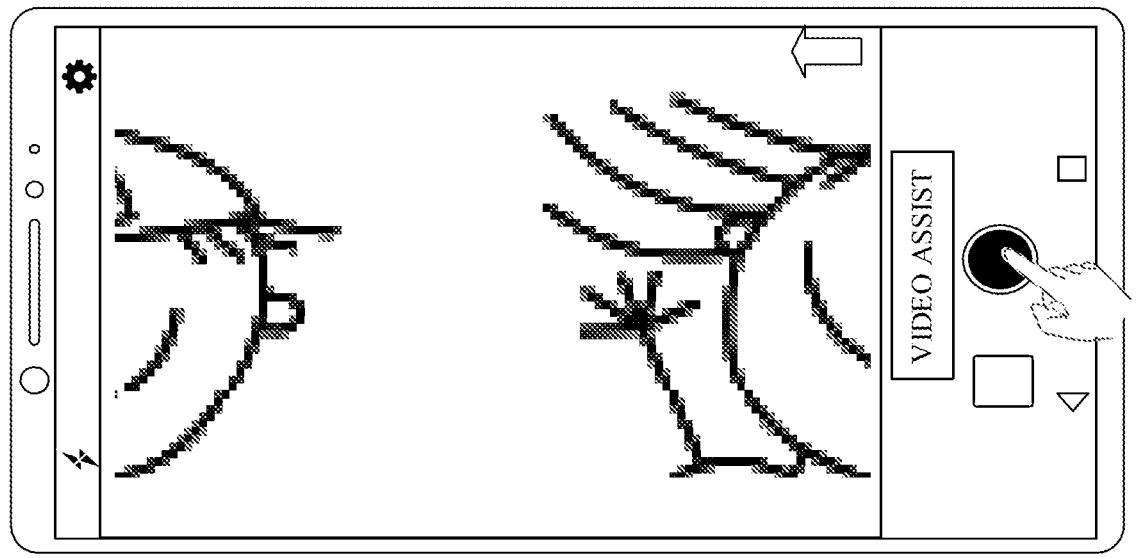

After the mobile phone detects an operation of tapping the second control 1102 by the user, as shown in FIG. 11B, the mobile phone may enter a telephoto assist video recording sub-mode. In the telephoto assist video recording sub-mode, the mobile phone may guide the user to move the mobile phone, so that the long-focus camera lens locks the target object as much as possible.

Figure 11C:
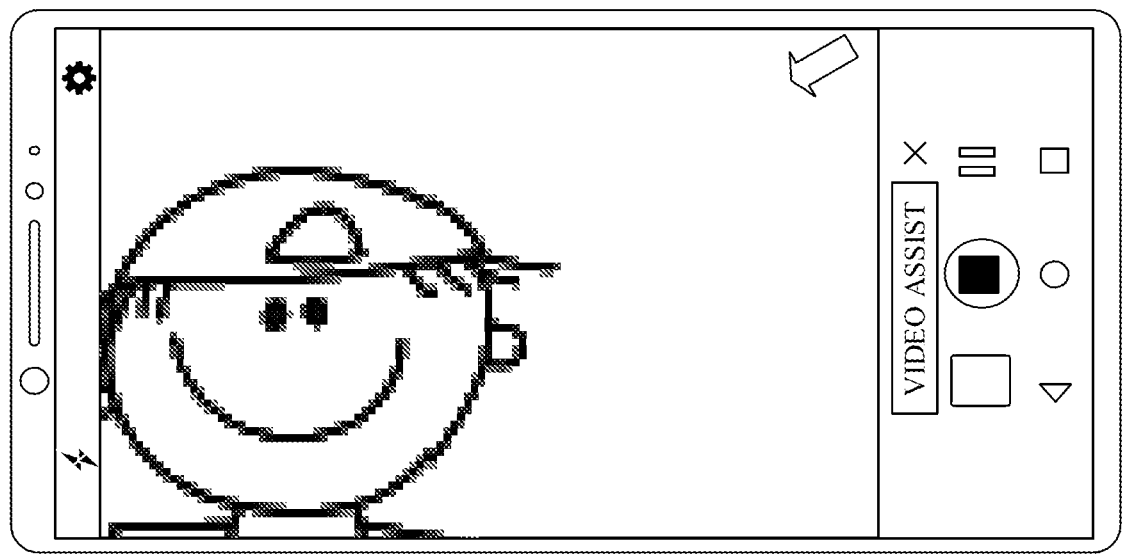

The mobile phone starts video recording after detecting an operation of tapping a control 1103 by the user. In the video recording process, particularly in a process of performing video recording on the target object in the moving state, referring to FIG. 11C, the mobile phone may guide the user to move the mobile phone, so that the user can use the long-focus camera lens to lock the target object as much as possible. In this way, the mobile phone tracks the target object in real time, and performs the video recording on the target object.

In addition, the method provided in this embodiment of this application may be further applied to a plurality of other scenarios. In this method, the long-focus camera lens of the electronic device is assisted in locking the target object to take a picture by moving the electronic device through guidance. For example, in a monitoring apparatus with a plurality of camera lenses, a plurality of camera lenses used for monitoring include a wide-angle camera lens and a long-focus camera lens. The wide-angle camera lens has a wide monitoring region. By using a picture recognition technology, the monitoring apparatus may capture a suspicious region or a region that needs to be especially monitored, that is, the foregoing target object. The monitoring apparatus may guide the long-focus camera lens to move, thereby locking and taking a picture of the suspicious region or the region that needs to be especially monitored.

Figure 12:
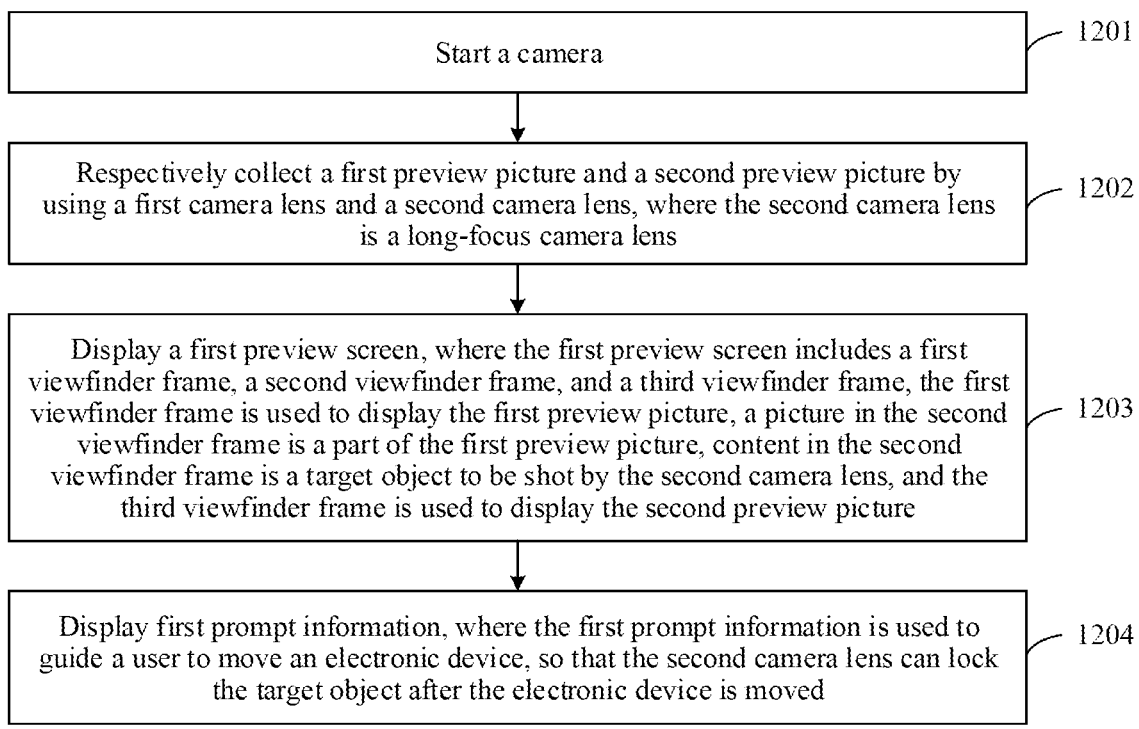
FIG. 12 is a flowchart of a shooting method according to an embodiment of this application.

Another embodiment of this application provides a shooting method. Referring to FIG. 12, the method may include:

1201. An electronic device starts a camera.

1202. The electronic device respectively collects a first preview picture and a second preview picture by using a first camera lens and a second camera lens, where the second camera lens is a long-focus camera lens, and a framing range of the first camera lens is greater than a framing range of the second camera lens.

1203. The electronic device displays a first preview screen, where the first preview screen includes a first viewfinder frame, a second viewfinder frame, and a third viewfinder frame, the first viewfinder frame is used to display the first preview picture, a picture in the second viewfinder frame is a part of the first preview picture, content in the second viewfinder frame is a target object to be shot by the second camera lens, and the third viewfinder frame is used to display the second preview picture.

1204. The electronic device displays first prompt information, where the first prompt information is used to guide a user to move the electronic device, so that the second camera lens can lock the target object after the electronic device is moved.

In this way, after the electronic device switches from the first camera lens such as a wide-angle camera lens or a middle-focus camera lens to a long-focus camera lens, namely, the second camera lens, the electronic device may use the prompt information to guide the user to move the electronic device. In this way, the long-focus camera lens can quickly lock the target object after the electronic device is moved. Further, the electronic device can take a picture of the target object by using the long-focus camera lens.

In some embodiments, after the electronic device displays the first preview screen, the method may further include: detecting, by the electronic device, a dragging operation performed on the second viewfinder frame by the user; and moving, by the electronic device, the second viewfinder frame on the first preview picture in response to the dragging operation, where the target object changes with a location of the second viewfinder frame. In other words, the user may specify the target object in a shooting scenario.

In this way, after the electronic device switches from the camera lens such as a wide-angle camera lens or a middle-focus camera lens to the long-focus camera lens, the electronic device may guide, based on the target object specified by the user, the user to move the electronic device. Therefore, the user may move the electronic device according to the guidance, so that the long-focus camera lens can quickly lock the target object after the electronic device is moved.

In addition, the electronic device may further perform steps and functions performed by the mobile phone in the foregoing embodiment, to implement the shooting method provided in the foregoing embodiment.

An embodiment of this application further provides an electronic device. The electronic device may include a start unit, a collecting unit, a display unit, a processing unit, a moving unit, a shooting unit, and the like. These units may perform the steps in the foregoing embodiments to implement the shooting method.

An embodiment of this application further provides an electronic device. The electronic device includes: one or more processors; a memory; and a touchscreen, configured to: detect a touch operation and display a screen. The memory stores code. When the code is executed by the one or more processors, the electronic device is enabled to perform the steps in the foregoing embodiments to implement the shooting method in the foregoing embodiments.

For example, when the electronic device is the device shown in FIG. 1A, the processor in the electronic device may be the processor 110 shown in FIG. 1A, the memory in the electronic device may be the internal memory 121 shown in FIG. 1A, and the touchscreen in the electronic device may be a combination of the display screen 194 and the touch sensor 180K shown in FIG. 1A.

An embodiment further provides a computer storage medium. The computer storage medium stores a computer instruction. When the computer instruction is run on an electronic device, the electronic device is enabled to perform the related method steps to implement the shooting method in the foregoing embodiments.

An embodiment of this application further provides a computer program product. When the computer program product is run on a computer, the computer is enabled to perform the foregoing related steps to implement the shooting method in the foregoing embodiments.

In addition, an embodiment of this application further provides an apparatus. The apparatus may be specifically a chip. The chip may include a processor and a memory. The memory stores an instruction. When the instruction is executed by the processor, the chip is enabled to perform the foregoing related steps to implement the shooting method in the foregoing embodiments.

In addition, an embodiment of this application further provides an apparatus. The apparatus may be specifically a component or a module. The apparatus may include a processor and a memory that are connected. The memory is configured to store a computer executable instruction. When the apparatus runs, the processor may execute the computer executable instruction stored in the memory, so that a chip performs the shooting method in the method embodiments.

The electronic device, the chip, the computer storage medium, or the computer program product or the chip provided in the embodiments of this application may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for capturing an image using an electronic device having a camera, comprising:
    starting the camera in response to a first user input;
    displaying a first preview interface including a first preview image captured by a default lens of the camera;
    displaying a second preview interface in response to a second user input for increasing a zoom ratio in the first preview interface and when the zoom ratio is greater than or equal to a threshold value, the second preview interface including a first frame and a second frame, the first frame including an assistant preview image captured by an assistant lens, and the second frame including a second preview image captured by a telephoto lens, wherein the first frame further includes a target viewfinder frame, and the target viewfinder frame includes a part of the assistant preview image; and
    wherein a zoom ratio of the second preview image has a negative correlation with a size of the target viewfinder frame.

2. The method of claim 1, further comprising starting the assistant lens and the telephoto lens when the zoom ratio in the first preview interface is greater than or equal to the threshold value.

3. The method of claim 1, wherein the assistant lens includes at least one of a group of a wide-angle lens or a median focus lens.

4. The method of claim 1, wherein the assistant lens includes the default lens.

5. The method of claim 1, wherein the default lens includes a wide-angle lens.

6. The method of claim 1, wherein the second frame has a fixed size.

7. The method of claim 1, wherein a field of view of the telephoto lens overlaps a portion of a field of view of the assistant lens.

8. The method of claim 1, further comprising displaying a prompt configured to guide a user to move the electronic device.

9. The method of claim 1, wherein a size of the target viewfinder frame decreases while the zoom ratio of the second preview image increases.

10. The method of claim 1, wherein a size of the target viewfinder frame increases while the zoom ratio of the second preview image decreases.

11. The method of claim 1, wherein a zoom ratio of the third frame is the same as a zoom ratio of the assistant preview image.

12. The method of claim 1, wherein a size of an image in the target viewfinder frame changes when a zoom ratio of the assistant preview image changes.

13. The method of claim 1, wherein the target viewfinder frame is at a center region of the assistant preview image.

14. The method of claim 1, wherein the target viewfinder frame includes an image of a target to be captured by the telephoto lens.

15. The method of claim 1, further comprising adjusting the zoom ratio of the second preview image in the second frame in response to a third user input for changing the zoom ratio, wherein the third user input is one of a group of a pinching operation and a sliding operation.

16. The method of claim 1, further comprising:
    determining adjustment information based on the target viewfinder frame and the second frame for adjusting a movement of the electronic device; and
    generating a prompt for guiding a user to move the electronic device until the telephoto lens captures a target object in the target viewfinder frame.

17. An electronic device, comprising:
    a touchscreen configured to receive user inputs and display one or more interfaces;
    one or more processors; and
    a memory storing computer-executable codes, the computer-executable codes, when executed by the one or more processor, causing the one or more processor to carry out:
        starting the camera in response to a first user input;
        displaying a first preview interface including a first preview image captured by a default lens of the camera;
        displaying a second preview interface in response to a second user input for increasing a zoom ratio in the first preview interface and when the zoom ratio is greater than or equal to a threshold value, the second preview interface including a first frame and a second frame, the first frame including an assistant preview image captured by an assistant lens, and the second frame including a second preview image captured by a telephoto lens, wherein the first frame further includes a target viewfinder frame, and the target viewfinder frame includes a part of the assistant preview image; and wherein a zoom ratio of the second preview image has a negative correlation with a size of the target viewfinder frame.

\* \* \* \* \*